(12) United States Patent
Wu et al.

(10) Patent No.: US 10,063,460 B2
(45) Date of Patent: Aug. 28, 2018

(54) METHOD AND APPARATUS FOR SHORTENING MULTI-HOP ROUTES IN A WIRELESS AD HOC NETWORK

(71) Applicant: The MITRE Corporation, McLean, VA (US)

(72) Inventors: Pui W. Wu, Chelmsford, MA (US); Richard J. Barron, Waltham, MA (US)

(73) Assignee: The MITRE Corporation, McLean, VA (US)

( * ) Notice: Subject to any disclaimer, the term of this patent is extended or adjusted under 35 U.S.C. 154(b) by 184 days.

(21) Appl. No.: 14/871,700

(22) Filed: Sep. 30, 2015

(65) Prior Publication Data
US 2017/0093687 A1    Mar. 30, 2017

(51) Int. Cl.
*H04L 12/733*    (2013.01)

(52) U.S. Cl.
CPC .................................. *H04L 45/122* (2013.01)

(58) Field of Classification Search
None
See application file for complete search history.

(56) References Cited

U.S. PATENT DOCUMENTS

| | | | | |
|---|---|---|---|---|
| 5,737,318 | A * | 4/1998 | Melnik | H04L 12/2807 370/254 |
| 5,987,011 | A * | 11/1999 | Toh | H04W 40/10 370/255 |
| 6,456,599 | B1 * | 9/2002 | Elliott | H04W 40/26 370/254 |
| 6,816,460 | B1 | 11/2004 | Ahmed et al. | |
| 7,486,627 | B2 * | 2/2009 | Zhang | H04L 45/121 370/255 |
| 7,957,355 | B1 | 6/2011 | Heiferling et al. | |
| 8,042,017 | B2 | 10/2011 | Buddhikot et al. | |

(Continued)

FOREIGN PATENT DOCUMENTS

WO    WO-2014/167549    10/2014

OTHER PUBLICATIONS

Santiváñez, Cesar A. et al., "Hazy Sighted Link State (HSLS) Routing: A Scalable Link State Algorithm," BBN Technologies, BBN Technical Memorandum No. 1301, Aug. 2001; 47 pages.

(Continued)

*Primary Examiner* — Hassan Phillips
*Assistant Examiner* — Gautam Sharma
(74) *Attorney, Agent, or Firm* — Morrison & Foerster LLP

(57) ABSTRACT

A method for routing data packets in a network comprising, at a first node of the network, establishing communication with a plurality of neighbor nodes in the network, determining a destination node for a data packet, determining a path for routing the data packet from the first node to the destination node, wherein the path comprises one or more relay nodes for relaying the data packet from the first node to the destination node, the one or more relay nodes comprising a first neighbor node of the plurality of neighbor nodes for receiving the data packet from the first node, identifying among the one or more relay nodes and the destination node a second neighbor node of the plurality of neighbor nodes, and in accordance with the identification of the second neighbor node, transmitting the data packet to the second neighbor node.

27 Claims, 7 Drawing Sheets

(56) References Cited

U.S. PATENT DOCUMENTS

| | | | |
|---|---|---|---|
| 8,064,377 B2 | 11/2011 | Yi et al. | |
| 8,094,583 B2 | 1/2012 | Parker et al. | |
| 8,281,006 B2* | 10/2012 | Kikuchi | H04L 41/12 370/203 |
| 8,488,589 B2 | 7/2013 | Rudnick et al. | |
| 8,964,625 B2* | 2/2015 | Cemper | H04W 40/20 370/248 |
| 8,982,708 B1 | 3/2015 | McCabe et al. | |
| 2004/0218542 A1* | 11/2004 | Lee | H04L 41/00 370/248 |
| 2005/0058100 A1* | 3/2005 | Lee | H04W 40/24 370/331 |
| 2006/0193332 A1* | 8/2006 | Qian | H04L 12/18 370/397 |
| 2006/0274700 A1* | 12/2006 | Janneteau | H04L 45/02 370/338 |
| 2007/0112803 A1* | 5/2007 | Pettovello | G06F 17/30094 |
| 2007/0211686 A1* | 9/2007 | Belcea | H04L 41/00 370/345 |
| 2010/0322245 A1* | 12/2010 | Valko | H04L 29/12 370/392 |
| 2011/0164527 A1 | 7/2011 | Mishra et al. | |
| 2012/0030150 A1 | 2/2012 | McAuley et al. | |
| 2012/0087297 A1* | 4/2012 | Park | H04W 40/00 370/315 |
| 2013/0121335 A1 | 5/2013 | Hui et al. | |
| 2013/0159550 A1 | 6/2013 | Vasseur | |

OTHER PUBLICATIONS

Jacquet, P. et al., "Optimized Link State Routing Protocol for Ad Hoc Networks," *Multi Topic Conference*, 2001, pp. 1-7.

Kadivar, Mehdi et al., "Distributed topology control algorithm based on one- and two-hop neighbors' information for ad hoc networks," *Computer Communications 32* (2009), pp. 368-375.

Datta, Amitava et al., "A Survey of State-of-the-Art Routing Protocols for Mobile Ad Hoc Networks," Mobile Data and Intelligence, Part 1, 2010, pp. 3-25.

Liang, Z. et al., "Pro-Reactive Route Recovery with Automatic Route Shortening in Wireless Ad Hoc Networks," *Tenth International Symposium on Autonomous Decentralized Systems, IEEE*, Mar. 2011, pp. 57-64.

Prabu, K. et al., "Performance Analysis of Modified OLSR Protocol for Manet," *I-manager's Journal on Software Engineering*, vol. 8, No. 2, Oct.-Dec. 2013, pp. 20-25.

Shelja, S. et al., "Performance Improvement of OLSR Protocol by Modifying the Routing Table Construction Mechanism," *International Conference on Reliability, Optimization and Information Technology*, IEEE, India, Feb. 2014, pp. 182-187.

\* cited by examiner

METHOD AND APPARATUS FOR SHORTENING MULTI-HOP ROUTES IN A WIRELESS AD HOC NETWORK

STATEMENT REGARDING FEDERALLY SPONSORED RESEARCH OR DEVELOPMENT

This invention was made with Government support under U.S. Government contract W56KGU-14-C-0010 awarded by the U.S. Department of the Army. The Government has certain rights in this invention.

FIELD OF THE INVENTION

The present invention is generally related to wireless networks and more specifically to mobile ad hoc networks.

BACKGROUND OF THE INVENTION

A mobile ad hoc network (MANET) is a wireless network that includes a collection of nodes whose positions and participation in the network are continually changing. Unlike conventional wired and wireless networks, a MANET does not rely on fixed infrastructure. Instead, most or all the nodes of a MANET function as routers. MANETs can be important in many situations such as during natural disasters and on the battlefield because they do not require fixed infrastructure and are typically more fault-tolerant than infrastructure-based networks. For example, a cell tower that covers a large number of nodes can represent a single point of failure—if the cell tower goes down, so does its coverage area. In contrast, if one node in MANET goes down, the rest of the network is generally not affected because traffic can be rerouted via the rest of the nodes. A MANET on the battlefield may include nodes such as a rearward command center, mobile communicators carried by individual soldiers, land vehicles, aircraft, semi-permanent base or relay stations, randomly placed sensors with radio communication (e.g., motion detectors air dropped into forward areas), and scattered relay nodes.

As described in U.S. Pat. No. 7,957,355 (incorporated herein by reference in its entirety), devices in a MANET (nodes) may be randomly-placed, may move about unpredictably, and may enter or leave the network at any time. Typically, the broadcasting range of a node in a MANET is only a fraction of the overall network size. Thus, for information to be sent from a first node to another node outside of the first node's range, the packet must "hop" through one or more intermediate nodes. For example, referring to FIG. 1, MANET nodes generally communicate information by relaying a data "packet" from a source node 110 to a destination node 115 by hopping through intermediate nodes 122, 124, and 126, since destination node 115 may not be within the broadcast range of source node 110. For example, source node 110 has a broadcast range 140 that does not reach the desired destination node 115, but does reach neighbor node 122, which would be the first intermediate node for routing a data packet from source node 110 to destination node 115. Likewise, second intermediate node 124 is within the first intermediate node's broadcast range 142; third intermediate node 126 is within the second intermediate node's broadcast range 144; and finally the destination node 115 is within the third intermediate node's broadcast range 146.

The network topology illustrated in FIG. 1 would not likely remain for long in a real scenario because the mobility of the nodes causes frequent changes in network topology. This varying network topology causes difficulty in applying routing techniques used in conventional wired or wireless networks. Conventional MANET routing protocols are topology-based protocols that evolved from the wired world. Topology-based MANET routing protocols are broadly categorized into two main groups: proactive and reactive. In a reactive protocol, routes have to be discovered on demand before they can be used, which incurs a discovery delay, thereby increasing latency, which may not be acceptable in certain applications. In a proactive, or table-driven protocol, the routes to all destinations within the network are disseminated and maintained before use. The advantage of the proactive protocols is that the requested route is available immediately whereas in reactive protocols the route may need to be discovered first.

Conventional networks typically employ proactive routing protocols. The nodes in a conventional network are stationary, and the links connecting the nodes go down infrequently. As such, it is possible to maintain the whole network topology at each node by sending topology-related information to all the nodes in the network via "link-state" updates. Since nodes go down infrequently, link-state updates are infrequent. However, in a MANET, link-state changes are more frequent because of the shifting topology, thus requiring many more link-state update messages to be propagated throughout the MANET, consuming valuable bandwidth in the process.

One of the key challenges in MANETS, then, is that the amount of routing control overhead can consume a large portion of the limited available bandwidth, which is known in the art as the broadcast storm problem. This problem is especially acute in dense deployment scenarios where a good portion of the nodes are one-hop away from each other (are neighbor nodes) and the rest are two and more hops away. The size of the routing control packets in these scenarios can be quite large because each node has a large number of one-hop neighbors and each of these hops needs to be described in each routing control packet. Dense or moderately dense scenarios arise often in real life as nodes tend to form dense clusters.

Therefore, it is desirable to minimize the amount of routing control overhead needed for route maintenance in a proactive routing protocol for a MANET.

BRIEF SUMMARY OF THE INVENTION

According to some embodiments, a proactive routing algorithm is split into two separate steps. A sparse version of a MANET's topology is propagated through the network in order to reduce the size of routing control overhead transmitted over the network. A node routing data feeds this sparse topology into a link state routing algorithm, which may produce a suboptimal, multi-hop route. However, the node's dense local topology information is not discarded, but just applied late, in a second step that can shorten the route produced in the first step. Together these two steps can ensure that the size of routing control overhead is reduced while at the same time not incurring a multi-hop routing penalty.

According to some embodiments, a node in a MANET contributes to the propagation of the sparse network topology by reducing the number of its neighbor nodes that it includes in its routing control messages. According to some embodiments, this "neighbor pruning" enables a larger MANET because the routing control overhead grows linearly with the number of nodes, rather than exponentially, as in conventional MANETs. The node generates a routing path to a destination node based on its own pruned neighbor list as well as on the sparse topology information it receives from other nodes in the MANET. When routing data to the destination node, instead of transmitting the data to the first intermediate node on the path according to conventional routing protocols, the node first checks to see if the path includes neighbor nodes. If it identifies a node along the path as a neighbor node, it transmits the data to that neighbor node instead of to the first node of the path. This route shortening can reduce the amount of time required for routing a packet to its destination and reduces the network traffic by reducing the number of transmissions.

According to some embodiments, a method for routing data packets in a network comprises, at a first node of the network, establishing communication with a plurality of neighbor nodes in the network, determining a destination node for a data packet, determining a path for routing the data packet from the first node to the destination node, wherein the path comprises one or more relay nodes for relaying the data packet from the first node to the destination node, the one or more relay nodes comprising a first neighbor node of the plurality of neighbor nodes for receiving the data packet from the first node, identifying among the one or more relay nodes and the destination node a second neighbor node of the plurality of neighbor nodes, and in accordance with the identification of the second neighbor node, transmitting the data packet to the second neighbor node.

In any of these embodiments, the network may be a wireless ad hoc network that routes data within the network using wireless radio signals. In any of these embodiments, establishing communication with a plurality of neighbor nodes may comprise communicating directly with each node of the plurality of neighbor nodes.

In any of these embodiments, establishing communication with a plurality of neighbor nodes may comprise broadcasting a first message comprising identification of the first node, receiving a neighbor message from each neighbor node in the plurality of neighbor nodes, wherein for a respective neighbor node, the neighbor message comprises the identification of the first node and identification of the respective neighbor node, and broadcasting a second message containing identification of the first node and identification of each neighbor node in the plurality of neighbor nodes.

In any of these embodiments, the plurality of neighbor nodes may be within radio communication range of the first node. In any of these embodiments, identifying the second neighbor node may comprise selecting a first selected node of the one or more relay nodes and the destination node, determining whether the plurality of neighbor nodes comprises the first selected node, in accordance with a determination that the plurality of neighbor nodes does not comprise the first selected node, selecting a second selected node of the one or more relay nodes, wherein the second selected node is selected so as to be between the first selected node and the first node on the path, and determining whether the plurality of neighbor nodes comprises the second selected node.

In any of these embodiments, the first node may receive, from a respective node in the network, information about a subset of neighbor nodes for the respective node and the path may be determined based on the information.

In any of these embodiments, prior to determining the destination node for the data packet, the first node may receive a message originated by the destination node comprising a list of one or more selected neighbor nodes, and the path for routing the data packet is determined at least in part based on the list of one or more selected neighbor nodes.

In any of these embodiments, the method may reduce an amount of nodes required to relay the data packet from the first node to the destination node.

According to some embodiments, a device for routing data packets in a network, comprises one or more processors, memory, and one or more programs, wherein the one or more programs are stored in the memory and configured to be executed by the one or more processors, the one or more programs comprising instructions for establishing communication with a plurality of neighbor nodes in the network, determining a destination node for a data packet, determining a path for routing the data packet from the device to the destination node, wherein the path comprises one or more relay nodes for relaying the data packet from the device to the destination node, the one or more relay nodes comprising a first neighbor node of the plurality of neighbor nodes for receiving the data packet from the device, identifying among the one or more relay nodes and the destination node a second neighbor node of the plurality of neighbor nodes, and in accordance with the identification of the second neighbor node, transmitting the data packet to the second neighbor node.

In any of these embodiments, the network may be a wireless ad hoc network that routes data within the network using wireless radio signals. In any of these embodiments, establishing communication with a plurality of neighbor nodes may comprise communicating directly with each node of the plurality of neighbor nodes.

In any of these embodiments, establishing communication with a plurality of neighbor nodes may comprise broadcasting a first message comprising identification of the device, receiving a neighbor message from each neighbor node in the plurality of neighbor nodes, wherein for a respective neighbor node, the neighbor message comprises the identification of the device and identification of the respective neighbor node, and broadcasting a second message containing identification of the device and identification of each neighbor node in the plurality of neighbor nodes.

In any of these embodiments, the plurality of neighbor nodes may be within radio communication range of the device. In any of these embodiments, identifying the second neighbor node may comprise selecting a first selected node of the one or more relay nodes and the destination node, determining whether the plurality of neighbor nodes comprises the first selected node, in accordance with a determination that the plurality of neighbor nodes does not comprise the first selected node, selecting a second selected node of the one or more relay nodes, wherein the second selected node is selected so as to be between the first selected node and the device on the path, and determining whether the plurality of neighbor nodes comprises the second selected node.

In any of these embodiments, the device may receive, from a respective node in the network, information about a subset of neighbor nodes for the respective node and the path is determined based on the information. In any of these embodiments, prior to determining the destination node for the data packet, the device may receive a message originated by the destination node comprising a list of one or more selected neighbor nodes, and the path may be determined at least in part based on the list of one or more selected neighbor nodes.

In any of these embodiments, the method may reduce an amount of nodes required to relay the data packet from the first node to the destination node.

According to some embodiments, a non-transitory computer readable storage medium stores one or more programs, the one or more programs comprise instructions, which when executed by a node of a network, cause the node to establish communication with a plurality of neighbor nodes in the network, determine a destination node for a data packet, determine a path for routing the data packet from the node to the destination node, wherein the path comprises one or more relay nodes for relaying the data packet from the node to the destination node, the one or more relay nodes comprising a first neighbor node for receiving the data packet from the node, identify among the one or more relay nodes and the destination node a second neighbor node of the plurality of neighbor nodes, and in accordance with the identification of the second neighbor node, transmit the data packet to the second neighbor node for relay to the destination node.

According to some embodiments a method for routing data packets in a network, comprises, at a first node of the network, establishing communication with a plurality of neighbor nodes in the network, determining a path for routing data from the first node to a second node in the network, wherein the path comprises one or more relay nodes for relaying the data from the first node to the second node, the one or more relay nodes comprising a first neighbor node of the plurality of neighbor nodes for receiving the data from the first node, identifying among the one or more relay nodes and the second node a second neighbor node of the plurality of neighbor nodes, storing, in a memory of the first node, at least a portion of a shortened path for routing data from the first node to the second node, wherein the at least a portion of the shortened path comprises at least the second neighbor node, determining that a destination for a data packet comprises the second node, and transmitting the data packet to the second neighbor node in accordance with the at least a portion of the shortened path.

In any of these embodiments, the network may be a wireless ad hoc network that routes data within the network using wireless radio signals. In any of these embodiments, establishing communication with a plurality of neighbor nodes may comprise communicating directly with each node of the plurality of neighbor nodes.

In any of these embodiments, establishing communication with a plurality of neighbor nodes may comprise broadcasting a first message comprising identification of the first node, receiving a neighbor message from each neighbor node in the plurality of neighbor nodes, wherein for a respective neighbor node, the neighbor message comprises the identification of the first node and identification of the respective neighbor node, and broadcasting a second message containing identification of the first node and identification of each neighbor node in the plurality of neighbor nodes.

In any of these embodiments, the plurality of neighbor nodes may be within radio communication range of the first node. In any of these embodiments, identifying the second neighbor node may comprise selecting a first selected node of the one or more relay nodes and the second node, determining whether the plurality of neighbor nodes comprises the first selected node, in accordance with a determination that the plurality of neighbor nodes does not comprise the first selected node, selecting a second selected node of the one or more relay nodes, wherein the second selected node is selected so as to be between the first selected node and the first node on the path, and determining whether the plurality of neighbor nodes comprises the second selected node.

In any of these embodiments, the first node may receive, from a respective node in the network, information about a subset of neighbor nodes for the respective node and the path is determined based on the information. In any of these embodiments, prior to determining the path for routing data from the first node to the second node, the first node may receive a message originated by the second node comprising a list of one or more selected neighbor nodes, and the path for routing the data may be determined at least in part based on the list of one or more selected neighbor nodes.

In any of these embodiments, the method may reduce an amount of nodes required to relay the data packet from the first node to the second node.

According to some embodiments, a device for routing data packets in a network, comprises one or more processors, memory, and one or more programs, wherein the one or more programs are stored in the memory and configured to be executed by the one or more processors, the one or more programs comprising instructions for establishing communication with a plurality of neighbor nodes in the network, determining a path for routing data from the device to a second node in the network, wherein the path comprises one or more relay nodes for relaying the data packet from the device to the second node, the one or more relay nodes comprising a first neighbor node of the plurality of neighbor nodes for receiving the data from the device, identifying among the one or more relay nodes and the second node a second neighbor node of the plurality of neighbor nodes, storing, in a memory of the first node, at least a portion of a shortened path for routing data from the first node to the second node, wherein the at least a portion of the shortened path comprises at least the second neighbor node, determining that a destination for a data packet comprises the second node, and transmitting the data packet to the second neighbor node in accordance with the at least a portion of the shortened path.

DETAILED DESCRIPTION OF THE INVENTION

Figure 1:
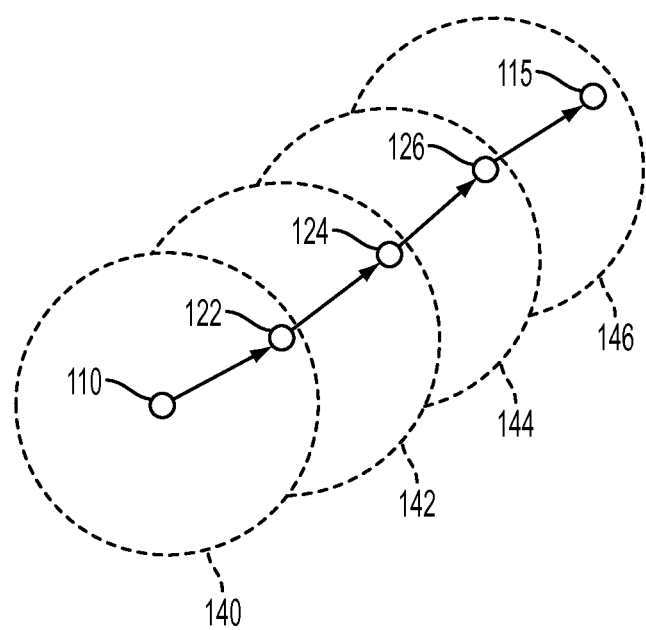
FIG. 1 is an illustration of routing in a conventional MANET.

Described below are systems, methods, and devices for optimizing routing in MANETs. After determining a routing path for routing a data packet to a destination node in a MANET, a source node analyzes the path to determine whether one or more portions of the path can be omitted. Upon determining that a portion of the path can be omitted, i.e., that the path can be shortened, the source node routes the data packet based on the shortened path.

The ability to optimize routing paths, according to these systems, methods, and devices, enables nodes in a network to generate sub-optimal routing paths that include more nodes than necessary, which in turn, enables reduction of required network maintenance overhead. The network is not penalized by these sub-optimal routing paths because of the optimizations described herein, and the reduction of network maintenance overhead can enable a larger network (more nodes) and/or greater data traffic.

The optimizations described herein can enable reduction of network maintenance overhead because nodes can determine routing paths based on limited awareness of other nodes in the network (conventional MANET routing protocols typically disseminate full network topology to all nodes in the network) without incurring a substantial routing penalty that may otherwise be caused by routing data on sub-optimally long paths. According to the optimizations described herein, a determined path that is sub-optimal in terms of including more nodes than necessary can be optimized by eliminating one or more portions of the path. By not requiring nodes to be aware of all the other nodes of the network, messages between nodes that communicate the presence of nodes (i.e., network maintenance overhead) can be reduced, both in terms of frequency and size.

According to some embodiments, the reduction of network maintenance overhead is realized by the dissemination throughout the network of sparse network topology (e.g., based on neighbor pruning). In other words, the presence of only some nodes of the network is communicated throughout the network. A routing algorithm can be used to generate routing paths based on this sparse network topology. Because not every node is known to the routing algorithm of a given node, a path generated by the given node may be longer—i.e., may include more nodes—than would otherwise have been the case if full network topology were known to the node.

According to the methods, systems, and devices described herein, potentially sub-optimal paths generated by a node based on limited network awareness, as described above, can be optimized by applying more expansive awareness of the node's immediate neighborhood—those nodes with which it directly communicates—than that used in generating a given path. This optimization can occur in a second step that can shorten the route produced in a first step. These steps can contribute to ensuring that the size of routing control overhead is reduced while at the same time any multi-hop routing penalty is reduced or eliminated.

Generally, prior to routing data in a MANET, nodes first communicate network topology and generate routing paths across the network. Once those paths have been generated, data can be routed from one end of the network to the other. Routing paths may be generated according to a link state routing protocol. The typical link state routing protocol requires nodes to communicate routing control information in order for routing paths to be generated. Routing control information communicated by a node may include information about the local network topology, typically including a list of all the node's one-hop neighbors (along with metadata related to the links to those neighbors). For a dense network, this routing control information can be immense. According to some embodiments, routing control information can be reduced by pruning the list of neighbors to a smaller subset. For example, where a complete list of a node's neighbors includes 200 entries, the list may be pruned to 20 while still maintaining connectivity of the network—i.e., while still maintaining at least one routing path between any two given nodes.

Dissemination of routing control information using pruned neighbor lists may result in a node's limited awareness of the topology of the network (it may generate a sparser awareness of the network than is truly the case). According to link state routing algorithms, the disseminated network topology is generally fed into a link state routing protocol algorithm to generate routing paths. A drawback of generating routing paths using a sparse network topology based on the dissemination of pruned neighbor lists is that the generated paths may include more relay nodes than paths generated based on full network topology. For example, what might have been just a one hop transmission could turn into a three-hop or more route, requiring use of the network three times instead of one, which is an inefficient use of the network's radio medium. According to some embodiments, although nodes prune neighbor lists for the purposes of disseminating a sparse network topology, nodes remain fully aware of their neighborhood—i.e., they maintain knowledge of their own neighbor nodes. This knowledge can be used to shorten a generated path by checking if relay nodes on the routing path are neighbor nodes. If so, data is routing to the identified neighbor node, instead of to the first node on the path.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Mobile Ad Hoc Network

A MANET (also referred to herein as a network), according to some embodiments, may generally include mobile platforms—herein simply referred to as "nodes"—that are free to move about arbitrarily. Nodes may be located, for example, on airplanes, ships, trucks, cars, people, and/or very small devices. There may be multiple hosts (devices) connected to a given node. The network may operate in isolation or may have gateways to and interface with a fixed network.

MANET nodes can be equipped with wireless transmitters and receivers. Transmitters and receivers may be coupled to antennas, which may be omnidirectional (broadcast), highly-directional (point-to-point), steerable, or some combination thereof. According to some embodiments, depending on the positions of nodes and, for example, their transmitter and receiver coverage patterns, transmission power levels, and interference levels, a wireless connectivity in the form of a random, multi-hop graph ("ad hoc" network) exists between the nodes. This ad hoc topology may change with time as the nodes move or adjust their transmission and reception parameters.

MANETs typically have several notable characteristics. For example, MANETs often have dynamic topology. Nodes can be free to move arbitrarily, and thus, the network topology may change randomly, rapidly, and/or unpredictably. Another typical characteristic is constrained bandwidth and variable capacity links. Wireless links often have lower capacity than their hard-wired counterparts. In addition, the realized throughput of wireless communications—after accounting for the effects of multiple access, fading, noise, and interference conditions, etc.—can often be much less than a radio's maximum transmission rate. One effect of relatively low to moderate link capacities is that congestion is more typical. Aggregate application demand can frequently approach or exceed network capacity. Another typical characteristic is energy-constrained operation. For example, some or all nodes of a MANET may rely on batteries or other exhaustible means for their energy. For these nodes, an important system design criteria may be energy conservation. As a benefit, the decentralized nature of network control in MANETs provides additional robustness against the single points of failure of more centralized approaches. For example, where a node runs out of battery, the network may automatically adjust and continue routing data.

Neighbor Pruning

Figure 2A:
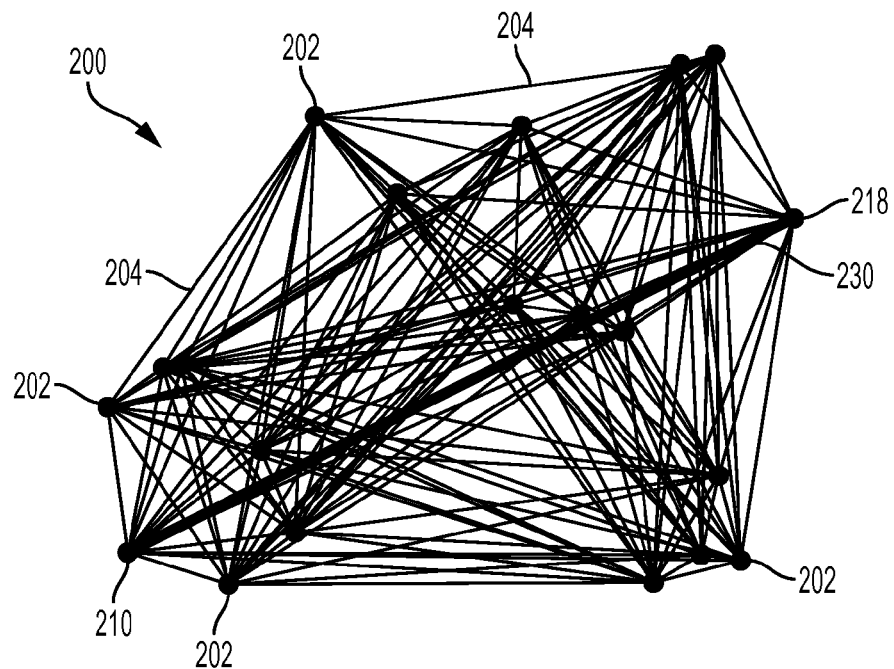
FIG. 2A is an illustration of a network graph for a dense network according to some embodiments.

FIG. 2A illustrates MANET 200 (also referred to as network 200) according to some embodiments. Network 200 includes multiple nodes 202 connected by links 204. A link indicates that the nodes connected by the link are within wireless communication range of each other. In network 200, each node is connected to each other node by a link. The topology of network 200 is established and maintained using a proactive routing protocol, such as Link State Routing (LSR). In LSR, two main types of routing control messages are sent over the network, HELLO messages and LSUs. Each node advertises its existence to its immediate neighborhood by means of HELLO messages. The recipients of these HELLO messages allow them to know its reachable neighborhood, but not beyond. The LSUs are similar to HELLO messages with the exception that they are also relayed and thus propagated/flooded throughout the entire network. The LSUs allow each node to learn about the network topology that lies beyond what could be inferred from HELLO messages alone. From the HELLO messages and LSUs, each node constructs a graph of the network (e.g., nodes in network 200 construct the graph illustrated in FIG. 2A) and then derives the route table from it. Each route in the table is a shortest path, typically computed via some variant of Dijkstra's shortest path algorithm.

In a dense scenario where there are an overabundant number of alternative routes between two nodes, there is a possibility to reduce the connections represented in the graph and still maintain connectivity between all nodes. A pruned and sparse graph may suffice, as long as the pruned graph remains connected. Maintaining a pruned graph requires less bandwidth to propagate the routing control overhead information over the network.

One of the ways to limit the size of control packets is via the use of neighbor pruning, i.e. deliberately supplying a subset of one-hop neighbors to the link state routing protocol so that it generates a smaller control packet. Maintaining a pruned graph requires less bandwidth to propagate the routing control overhead information over the network. However, this omission of some of the one-hop routes has the side-effect of generating multi-hop routes when it comes time to route actual data traffic to these omitted one-hop neighbors.

Figure 2B:
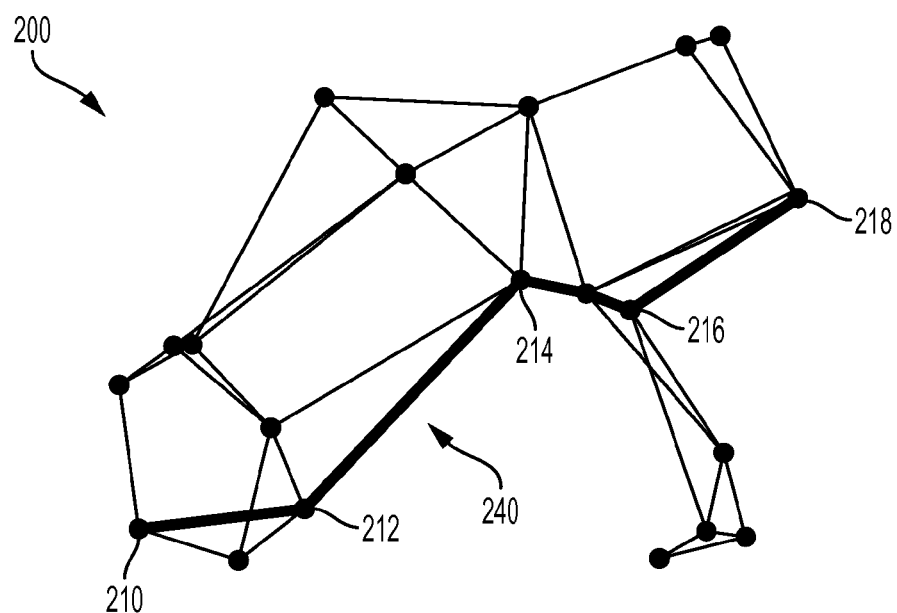
FIG. 2B is an illustration of a network graph for the dense network of FIG. 2A after neighbor pruning according to some embodiments.

Take for instance, the dense network of network 200 depicted in FIG. 2A, where every node is one-hop reachable from every other node. The link state protocol on each node would need to populate the LSUs with entries corresponding to each link to its one hop neighbor. The same group of nodes after neighbor pruning is illustrated in FIG. 2B. The network remains connected, that is, every node is reachable from every other node, though not necessarily in one hop. Because each node has a lot less one hop neighbors, it needs fewer entries in the LSUs that it sends out.

Comparing the two figures, there is a significant difference in the amount of topology information that needs to go into each link-state update for the fully connected graph of FIG. 2A compared to that for the pruned graph of FIG. 2B. For example, a link state update for node 210 in the full graph of FIG. 2A would include 18 entries—an entry for each of the 18 nodes (in this network each node is connected to each other node). However, a link state update for node 210 in the pruned graph of FIG. 2B would include just 3 entries even though a routing path remains between node 210 and every other node in network 200. The reduction in routing control overhead is even more dramatic for larger networks consisting of hundreds of nodes.

However, this pruning of the one-hop routes has the side-effect of generating multi-hop routes when it comes time to route actual data traffic. For example, in network 200, routing a data packet from node 210 to node 218 requires a single transmission directly from node 210 to node 218 using link 230. However, as shown in FIG. 2B, routing a data packet from node 210 to node 218 based on the pruned network may require routing through nodes 212, 214, and 216 (other paths are also possible) on path 240. Thus a one-hop route is turned into a multi-hop route, which means that a task that would require only one transmission/ reception based on the full network topology requires four transmissions/receptions based on the pruned network topology.

Route Shortening Mobile Ad-Hoc Network

Figure 3:
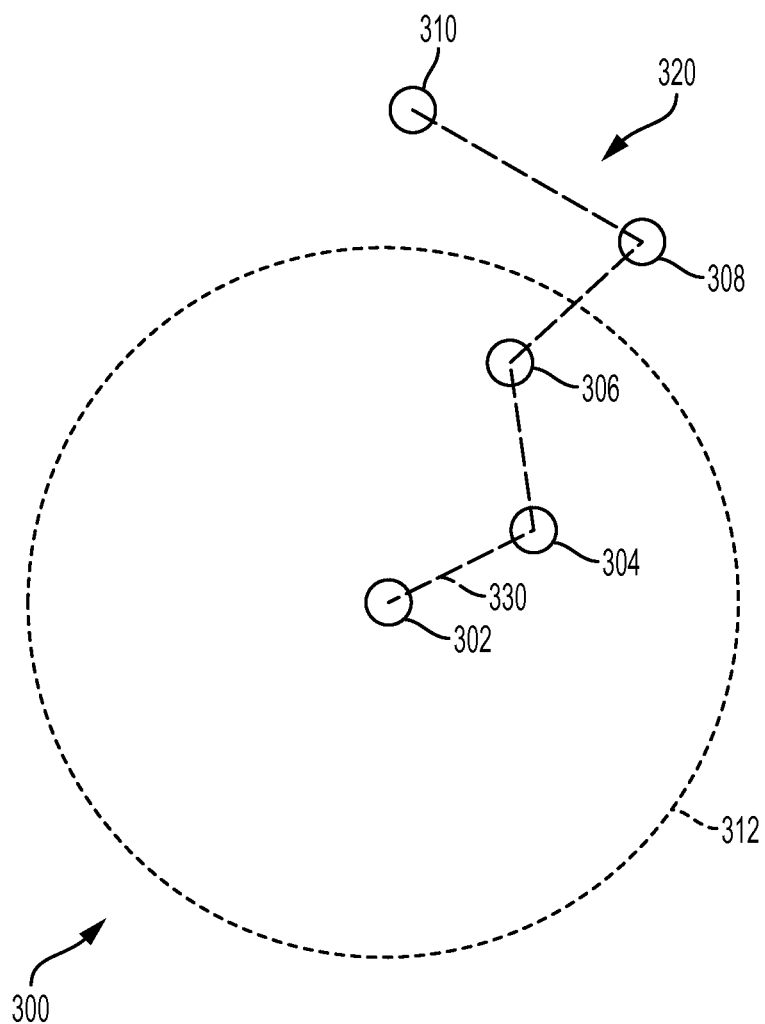
FIG. 3 is an illustration of routing in a MANET according to some embodiments.

According to some embodiments, in order to reduce or eliminate the multi-hop "penalty" associated with neighbor pruning, as described above, an additional step is employed that can shorten the multi-hop routes generated based on pruned network graphs according to link-state routing algorithms. FIG. 3 illustrates a MANET employing neighbor pruning and route shortening, according to systems, methods, and devices described herein. Network 300 may include multiple nodes generally interconnected wirelessly. Nodes in network 300 can be configured to route data traffic using neighbor pruning techniques and route shortening techniques according to methods and systems described herein. Generally, nodes in network 300 can establish communication, determine paths for routing data based on pruned neighbor information, determine whether a path can be shortened, and route the data based on the shortened paths. Network 300 includes source node 302, node 304, node 306, node 308, and destination node 310. Broadcast range 312 indicates the maximum distance from source node 302 within which source node 302 can establish communication with another node. For example, node 304 and node 306 are within broadcast range 312 and, therefore, source node 302 can establish communication with these nodes. Network 300 also includes nodes that are outside of broadcast range 312, such as node 308 and node 310, and therefore, direct communication cannot be established between these nodes and source node 302. Link 330 between source node 302 and node 304 indicates that direct, bi-directional communication is established between source node 302 and node 304.

One or more nodes in network 300 may be mobile. Links between devices in the network 300 may be created, removed, and/or modified over time according to any corresponding protocols followed by the nodes within network 300. In general, the links among devices or components within network 300 are wireless links, although wired links may optionally be employed in various locations such as between a node and a fixed infrastructure network. In order to maintain network 300, typically one or more protocols are shared among the participating devices to control creation, removal, and modification of individual data links between devices, and to route traffic and control information among the devices. The term protocol as used herein generally refers to any and all such rules, procedures, and/or algorithms used in maintaining network 300, unless a specific protocol is explicitly stated or otherwise clear from the context.

Nodes may include any general purpose nodes participating in network 300 according to suitable protocols. Nodes may, for example, include terminal nodes that send or receive data. Nodes may also or instead suitably be employed as intermediate nodes to route traffic to and from other nodes. Thus a MANET as described herein is generally extensible and, as new nodes appear within network 300, they may form a part of the network 300 fabric that routes traffic among other nodes. A new node may be introduced to network 300 with new links being added as the new node is detected. Nodes may also periodically leave network 300. As the departing node leaves the network, links between the departing node and other nodes may be severed. This may occur, for example when a device moves beyond geographical boundaries of network 300, when devices are turned off (or their wireless or networking capabilities are suspended), or when a hardware or software malfunction occurs. Network 300 may generally detect new and/or departing devices and/or links in order to maintain substantially continuous connectivity for nodes in network 300.

In general, a node may include any network or computing device that includes a wireless interface, network protocol stack(s), and the like adapted to participate in network 300. For example, the Internet Protocol may usefully be employed in nodes within network 300 in order to use well-established addressing schemes and the like. A node may include, without limitation, a device providing functionality other than participation in network 300, such as a cellular phone, satellite phone, wireless electronic mail client, laptop computer, desktop computer, video device, digital camera, electrical instrument, sensor, detector, display, media player, navigation device, smart phone, storage device, printer, digital radio, or any other device that might usefully participate in a network. A node may include a device that functions to connect another device, such as those listed above, to network 300, such as a wireless networking card or wireless router (e.g., for a local WiFi network). According to some embodiments, nodes connect multiple devices to network 300, for example, through a local area network (LAN). In some embodiments nodes may include a GPS receiver providing a position and timing reference.

Nodes may include access points provided to establish a permanent or otherwise generally stable infrastructure to portions of network 300. An access point may be fixed in location or may be limited in the amount that it can move. One or more access points may be mobile access points that can freely move within network 300. Access points may employ identical network functionality and protocol stacks as the nodes described above. Access points may also or instead encapsulate different functionality consistent with a more specialized role in network 300. According to some embodiments, access points may have no associated computing device that originates or consumes network traffic. That is, the access points may simply form a mesh of participants in network 300 and relay traffic among other network participants. An access point may also include a physical connection to a power infrastructure so that it may be physically installed at a location and operate autonomously without requiring regular maintenance, e.g., battery changes and the like. Access point may be of a size and weight making it suitable for mounting and/or concealment in a variety of locations including indoor and outdoor locations, and including mounting on walls, floors, ground, ceilings, roofs, utility poles, trees, and so forth.

Nodes in network 300 may have a varied transmit powers and/or antenna gains. Thus, some nodes may feature greater physical transmit (broadcast) and receive ranges than other nodes.

Network 300 may include one or more access points that generally operate to connect nodes within network 300 to a core network such as the Internet. A core network may be a fixed network or may be an infrastructure network. Access points may have one interface for interfacing with network 300 (e.g., that may include a wireless radio interface, protocol stack(s) and other components of other nodes within network 300) and another interface for interfacing with the core network. Core networks may connect disparate, geographically remote and/or local instances of network 300 to form a single network. Core networks may include any and all forms of IP networks, including LANs and Wide Area Networks, and so on. Core networks may also or instead include the public Internet, the Public Switched Telephone Network, a cellular communications network, or any other network or combination of networks for data traffic, voice traffic, media broadcasting, and so forth. In some embodiments, core networks may consist exclusively of a single zone of administrative control, or a number of zones of administrative control, or some combination of an administrative zone and any of the foregoing.

Network 300 may include nodes that do not physically move within network 300. In general, such fixed physical nodes within network 300 may provide useful routing alternatives for traffic that can be exploited for load balancing, redundancy, and so forth. This may include, for example, a fixed desktop computer within network 300.

Communication within network 300 may generally be accomplished via protocols. In general, any of the nodes above that participate in network 300 according to one or more protocols may include a hardware platform enabling radio software and firmware upgrades, which may include for example a dedicated or general purpose computing device, memory, digital signal processors, radio-frequency components, antenna(s), and any other hardware and/or software suitable for implementing the protocol in participating nodes.

In some embodiments, any of the foregoing nodes may also include an adapter for other networks such as an Ethernet network adapter or equivalent IP network adapter, router, and the like, so that non-MANET equipment can participate in network 300 through the device. Network 300 may be maintained independently without connections to any other networks, and may be usefully employed for the sole purpose of trafficking data among nodes.

System for Reducing Routing Control Overhead

Figure 4:
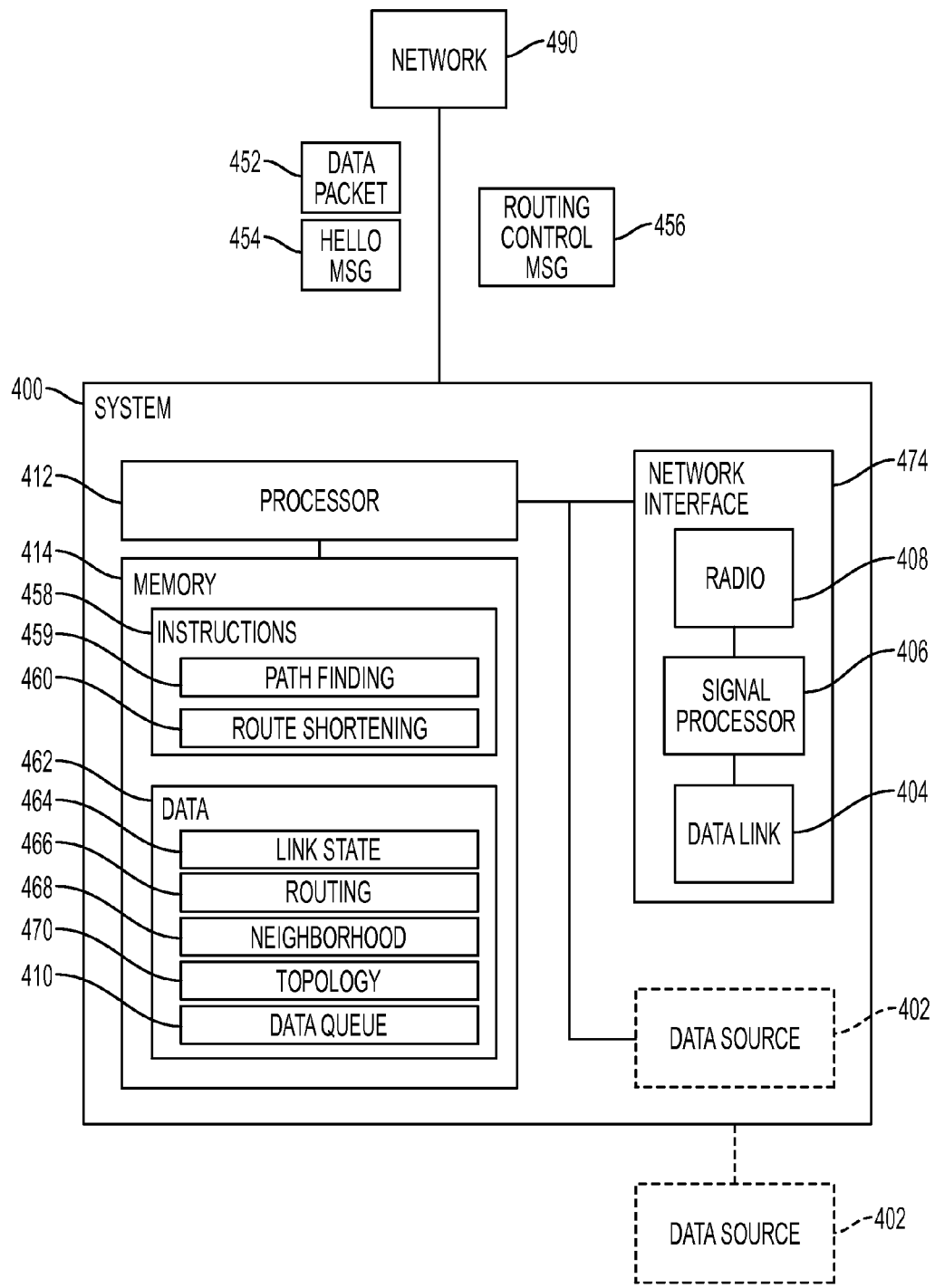
FIG. 4 is an illustration of a node in a MANET according to some embodiments.

FIG. 4 illustrates a functional diagram of system 400 connected to a MANET (e.g., source node 302 of network 300 of FIG. 3) according to methods and systems described herein. Node 400 may be a server, a mobile computing device, or any device described above with respect to network 300. Node 400 may contain a processor 412, memory 414 and other components typically present in computing devices. Node 400 is a node of network 490, and may be capable of directly and indirectly communicating with other nodes of the network through network interface 474 that may include data link 404, a signal processor 406, and radio 408. Network 490 may be an ad-hoc network such as a MANET. Node 400 may send and receive various types of data packets 452, HELLO messages 454, and routing control messages 456. Node 400 may include data sources 402 and data queues 410. It will be understood that the following description is general in nature, and that numerous arrangements of processing, storage, and radio frequency hardware may be suitably employed to similar affect. This description is intended to outline certain operations of a MANET node relevant to the systems and methods described herein, and is in no way intended to be limiting to the specific architecture shown in FIG. 4.

Memory 414 stores information accessible by processor 412, including instructions 458 and data 462 that may be executed or otherwise used by the processor 412. Memory 414 may be of any type capable of storing information accessible by the processor, including a non-transitory computer-readable medium, or other medium that stores data that may be read with the aid of an electronic device, such as a hard-drive, memory card, ROM, RAM, DVD or other optical disks, as well as other write-capable and read-only memories. Systems and methods according to some embodiments may include different combinations of the foregoing, whereby different portions of the instructions and data are stored on different types of media.

Instructions 458 may be any set of instructions to be executed directly (such as machine code) or indirectly (such as scripts) by the processor. For example, the instructions may be stored as computer code on the non-transitory computer-readable medium. The instructions may be stored in object code format for direct processing by the processor, or in any other computer language including scripts or collections of independent source code modules that are interpreted on demand or compiled in advance. The instructions may contain various algorithms, including path finding algorithms 459 used to find a best path from the node's network address to many, most, or all possible destination node in network 490, and route shortening algorithms 460 used to shorten the path from system 400 to a given destination node by determining whether one or more relay nodes are, e.g., 1-hop or 2-hop neighbors.

Processor 412 may be any conventional processor such as Intel Core2® processor, Intel Core2 Quad® processor, AMD Phenom Quad-Core® processor, Qualcomm Snapdragon 600® processor, ARM Cortex A9® processor, a MIPS® processor, a PowerPC® processor, an ALPHA® processor, etc. Alternatively, the processor may be a dedicated device such as an ASIC or specially designed FPGA. Although FIG. 4 functionally illustrates the processor and memory as being within the same block, it will be understood by those of ordinary skill in the art that the processor and memory may actually comprise multiple processors and memories that may or may not be stored within the same physical housing.

For example, memory may be a hard drive or other storage media located in a server farm of a data center. Accordingly, references to a processor or computer will be understood to include references to a collection of processors or computers or memories that may or may not operate in parallel.

Data 462 may be retrieved, stored or modified by processor 412 in accordance with instructions 458. For instance, although systems, methods, and devices herein are not limited by any particular data structure, the data may be stored in computer registers, in a relational database as a table having a plurality of different fields and records, XML documents or flat files. The data may also be formatted in any computer-readable format, and may comprise any information sufficient to identify the relevant information, such as numbers, descriptive text, proprietary codes, references to data stored in other areas of the same memory or different memories (including other network locations) or information that is used by a function to calculate the relevant data.

Data 462 may include link state information 464, routing information 466, neighborhood information 468, and topology information 470. These data constructs are for conceptual illustration purposes only are not intended to be limiting. Although illustrated here as distinct tables or data structures, the information described with respect to data 462 may be divided or combined into one or more data structures, tables, or the like, without limitation.

Link state information 464 may include link state information received from periodical topology control or link state update disseminations. The link state information includes characteristics about network nodes and the links connecting the nodes. Routing table 466 stores routing paths that are calculated by path finding algorithms 459. Neighbor table 468 may be used to store a list of neighbor nodes within a predetermined hop count, e.g., 1-hop or 2-hop, to facilitate periodic neighbor discovery. Topology table 470 may be constructed from the link state information and represents the topology of network 490.

Data sources 402 may include any applications or other hardware and/or software associated with system 400. This may include, for example, programs running on a laptop or other portable computing device, a web server or client, a multimedia input and/or output sources such as a digital camera or video, and so forth. More generally any device, sensor, detector, or the like that might send or receive data may operate as a data source 402 in system 400. According to some embodiments, some nodes, such as access points, may not have independent data sources 402, and may function exclusively to relay data among other nodes and/or provide network stability as generally described above.

Data link 404 may include hardware and/or software implementing data link layer functionality such as neighbor management, segmentation and reassembly of data packets, Quality of Service (QoS) management, data queue servicing, channel access, adaptive data rates, and any other suitable data link functions. In general, data link 404 controls participation of data sources 402, and more generally system 400, in a MANET. It will be understood that data link 404 may implement any number of lower layer (e.g., physical layer) or higher layer (e.g., routing, transport, session, presentation, application) protocols from a conventional Open Systems Interconnection (OSI) Model, or any such protocols, and related functions may be implemented elsewhere within system 400, such as in an IP stack executing on the data source 402, or in firmware within the signal processor 406 or radio 408, or in additional functional blocks not depicted in FIG. 4. For example, routing protocols may be implemented within hardware/software of the data link 404 in order to ensure that nodes in network 490 share appropriate routing functions. Thus it will be appreciated that while the certain elements discussed herein might suitably be placed within the data link layer of a formal protocol stack, the systems and methods of this disclosure might also or instead be implemented with variations to a conventional protocol stack, or without any formal protocol stack whatsoever.

Data link 404 may include a link manager that collects neighbor information from the data link layer, and may form and maintain neighborhood information in neighbor table 468 for system 400. Neighbor table 468 may be used to establish routes to neighbors, and may be updated periodically with information from one hop neighbors as described further below.

Signal processor 406 may include waveform processing and timing functions associated with transceiving data in system 400. This may include, for example, network timing, time-slot and/or frame-based waveform configuration, maintenance of one or more families of Orthogonal Frequency Division Multiplexing waveform modes (or other transmit mode waveforms), receiver detection of waveform modes, error correction coding, and so forth. In general, signal processor 406 may be implemented in any suitable combination of digital signal processors, field programmable gate arrays, application-specific integrated circuits, microprocessors, or other general or special-purpose computing devices.

Radio 408 generally operates to transmit data from data queue 410, as organized and encoded by data link 404 and the signal processor 406 (along with any control information, packet header information, and so forth), over a wireless interface to other nodes in a MANET and to perform complementary data reception. Radio 408 may include any radio frequency analog circuitry and the like, and may be coupled to signal processor 406 which converts data and control information between a digital representation used within system 400 and an analog representation used in radio frequency communications with other nodes. According to some embodiments, a low power radio 408 may be employed, such as where the system 400 is a battery-powered mobile device. In other embodiments, a high-power radio 408 may be employed, such as where the system 400 is a fixed access point connected to a fixed power infrastructure. According to some embodiments, radio 408 and signal processor 406 provide adaptive data rate coding capable of changing transmit modes, error correction, and the like according to measured link quality.

According to some embodiments, radio 408 may be configured to send and receive signals for routing information in network 490 in a single radio frequency operating band or multiple radio frequency operating bands. According to some embodiments, radio 408 operates in the Very High Frequency band from 30 to 300 MHz, in the low frequency band from 30-300 kHz, in a medium frequency band from 300-3000 kHz, in a high frequency band from 3-30 MHz, or in an Ultra high frequency band from 300-3000 MHz. Preferably, radio 408 is configured to operate from 30-2500 MHz. According to some embodiments, radio 408 operates below 10 GHz, below 1 GHz, below 900 MHz, below 800 MHz, or below 500 MHz. According to some embodiments, radio 408 operates above 1 GHz, above 6 GHz, above 10 GHz, or above 20 GHz. According to some embodiments, radio 408 operates between 928.000 MHz and 2.400 GHz, between 2.500 GHz and 5.725 GHz, and/or between 5.875 GHz and 24.000 GHz.

Data queue 410 may include any data for transmission from system 400. This may include, for example, data from data sources 402, data that is relayed by the system 400 from other nodes in the MANET, and/or control information scheduled for transmission within data packets from the system 400 (e.g., HELLO messages and topology control messages). Data queue 410 may be organized in any suitable fashion, and may include a single first-in-first-out queue, multiple queues, prioritized queues, and the like. According to some embodiments, system 400 may include multiple prioritized queues to assist in providing various service levels, such as for QoS traffic. In general, data in data queue 410 is delivered according to any suitable queuing mechanism to data link 404, signal processor 406, and radio 408 for transmission within the MANET.

Routing information 466 generally supports routing functions by system 400. This may include, for example, a routing table that includes destination addresses or identifiers (e.g., hardware addresses, IP addresses, etc.) for nodes within network 490, a cost of a path to a destination (using any suitably cost calculation), and a next hop on that path. Other information such as quality of service and other metrics for various routes and links may also be provided for more refined routing decisions. Routing information 466 also includes information about routing paths from system 400 to destination nodes in network 490. Unlike conventional routing tables that typically include only destination node identifiers and next hop identifiers, routing paths stored in routing information 466 include identifiers for each node on the path to a given destination node (e.g., as determined by path finding algorithms 459).

Neighborhood information 468 may be maintained in a database, flat file, routing table, or other suitably organized volatile or non-volatile storage within the system 400. Neighborhood information 468 generally supports the creation and maintenance of the MANET as well as routing functions of each MANET node. Within the MANET, each node may interact with other nodes to autonomously (without the direction or control of any other node or nodes such as fixed infrastructure) identify and maintain local network connections, shift capacity, dynamically form routes throughout the network, and so on. The routing functions of the node (as supported by the neighborhood information 468) may accommodate delay-sensitive (e.g. voice) traffic, delay-tolerant traffic with quality of service (QoS) prioritization, and so on.

Neighborhood information 468 may include an identification of neighboring nodes (e.g., those within broadcast range and/or those within broadcast range of a node within broadcast range) along with information relating to those nodes. This may include one-hop neighbors (i.e., neighboring nodes in direct wireless communication with system 400), two-hop neighbors (i.e., neighboring nodes that communicate with system 400 through only one other node), or any other nodes or participants within the MANET. In one aspect, neighborhood information 468 includes link quality information for radio 408, which may be obtained from any combination of physical layer and data link data, and may be employed to adapt the data rate of communications according to currently present channel conditions. The neighborhood information may also include QoS data used to select next hops for QoS data. Other useful information may include bandwidth utilization, node weights, node position (either logical or physical), and queue latency for each QoS type and/or other priority type.

According to some embodiments, neighborhood information 468 may be gathered during periodic exchanges (such as during topology control message transmissions) with neighboring nodes, which may occur under control of the link manager of the data link 404. For example, system 400 may determine output bandwidth (i.e., data transmit requirements) for each link that the system 400 has with a neighbor and may transmit this to one-hop neighbors. Similarly, system 400 may receive output bandwidth from each one-hop neighbor. Using this data, system 400 may further calculate its own input bandwidth (i.e., data receive requirements) from each link to a neighboring node, and this information may in turn be exchanged with one-hop neighbors.

Methods for Reducing Routing Control Overhead and Route Shortening

Described below are methods for route shortening in a mobile ad hoc network that may be performed by one or more nodes of the network to reduce network maintenance overhead. A node, according to the described methods, establishes its neighborhood, e.g. using known MANET protocols, generates a pruned neighbor set, floods its pruned neighbor set throughout the network, and receives pruned neighbor sets from other nodes in the network. The node may determine multi-hop paths for routing data from itself to possible destination nodes in the network (e.g., according to known path finding methods). The node may shorten a given multi-hop path by checking the given path to determine whether any nodes along the path are its neighbors. In general, the node can check nodes of the path, starting with the destination node and continuing backwards along the path, until a neighbor node is identified. If a neighbor node is identified, then the neighbor node can be selected as the next-hop node for data destined for the destination node.

Figure 5A:
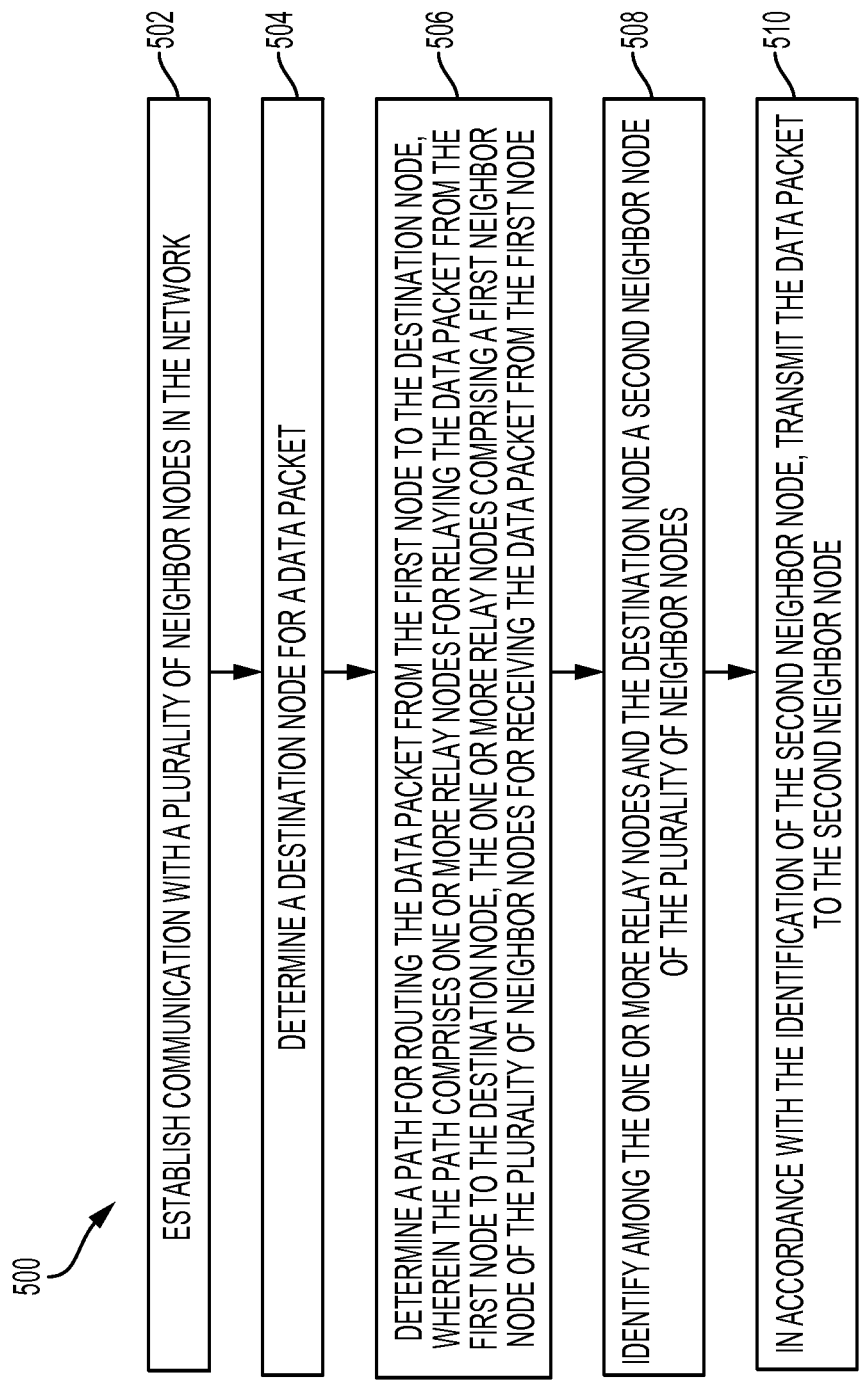
FIG. 5A is a flow diagram of a method for reducing routing control overhead according to some embodiments.

According to some embodiments, as described with respect to process 500 of FIG. 5A below, route shortening may be performed during the forwarding stage of data transmission at a node. In other words, route-shortening may be performed by a node in response to receiving or generating a data packet for transmission to a destination node. FIG. 5A is a process flow diagram illustrating process 500 for route shortening in a MANET. Process 500 may be performed by a first node of a MANET. For example, process 500 may be performed by source node 302 of network 300, as depicted in FIG. 3, according to the architecture described with respect to system 400 of FIG. 4.

At step 502, communication is established with a plurality of neighbor nodes in a network. For example, source node 302 may establish communication with nodes that are within its broadcast range 312. According to some embodiments, establishing communication for source node 302 includes broadcasting HELLO messages and receiving HELLO messages from nodes within its broadcast range. For example, according to some embodiments, source node 302 broadcasts HELLO messages that include its network identifier. Node 304 may receive node 302's HELLO messages and may transmit its own HELLO messages that include its own identifier as well as the identifier of source node 302, indicating that it received source node 302's broadcasts. Upon receiving node 304's HELLO message, source node 302 gains knowledge of node 304 and knows that node 304 received its HELLO message (because node 304's broadcast HELLO messages include source node 302's identity). Based on this, source node 302 can add node 304 to its neighbor list (e.g., stored in neighborhood information 468 of FIG. 4). According to some embodiments, the neighbor list may be included in broadcast HELLO messages. Thus, node 304 can be established as a neighbor node of source node 302 and vice versa. Source node 302 can establish communication with each node within its broadcast range 312, in similar fashion, such that each node within broadcast range 312 is a neighbor node of source node 302.

In addition to the HELLO message, source node 302 can also broadcast a topology control message (also referred to herein as routing control message and link state update). Unlike the HELLO message, which is not retransmitted by nodes that receive it, the topology control message is relayed by other nodes to propagate through the network. According to some embodiments, the topology control message may be relayed by each node that receives it and according to some other embodiments, the topology control message is relayed only by designated nodes (e.g., according to an Optimized Link State Routing Protocol).

The topology control message may include information about source node 302's neighborhood, such as the nodes with which it has established communication and has added to its neighbor list. According to some embodiments, source node 302 prunes its neighborhood information such that only a subset of its neighbors is included in the topology control message. Therefore, its topology control message, generated based neighbor pruning, can include fewer entries than a topology control message based on an un-pruned neighborhood would, thus requiring less data and using less network bandwidth. Other nodes within the network may prune their own neighborhoods and flood the network with topology control messages that include pruned neighborhood information. In this way, nodes within network 300 generate an incomplete graph of the interconnectedness of the nodes in the network (e.g., a pruned network graph as shown in FIG. 2B versus the un-pruned network graph shown in FIG. 2A). Although, pruned graphs are incomplete in terms of interconnectedness of nodes in the network, the network may remain completely connected such that every node is connected to every other node either directly or through one or more intermediate nodes. According to some embodiments, nodes formulate, store, and update a network graph based on pruned neighbor information of nodes within the network (e.g., pruned network graphs may be stored in topology information 470 in FIG. 4).

According to some embodiments, nodes may generate routing tables and/or routing paths based on the information in received topology control messages and their own pruned neighbor list. Based on the pruned graph of the network, nodes may perform routing path computations for determining optimal paths to transmit data packets to possible destination nodes, for example, based on known routing algorithms. Specific path calculation algorithms may be based on, for example, Djikstra's shortest-path algorithm, where the routing node finds the path with least cost to each destination node. The optimal paths selected may then be used to construct a routing table, which typically includes an entry for each destination node. Each entry includes the network identifier of a given destination node and the next hop node identifier of the node determined to be the optimal next node for relaying data to a given destination node. In addition to this information, nodes may maintain more detailed information about paths to destination nodes. For example, instead of maintaining only the identifier of the destination node and the identifier of the next hop node, nodes can maintain the identifiers of nodes along the path from the next hop node to the destination node. For example, where a path is determined to be: →A→B→C→D, instead of only maintaining identifiers for next hop node A and destination node D, a node can maintain identifiers for relay nodes B and C. Generally, the relative locations of nodes along a path are also maintained such that, for example, node C is known to be further along the path than node B.

At step 504, a destination node for a data packet is determined. For example, a data source of the node (e.g., node 302) may generate data for transmitting to a destination node (e.g., destination node 310). For example, a data source may be an email application on source node 302 that generates an email for transmitting to an email server. According to some embodiments, source node 302 does not itself generate the data, but instead, receives the data from another node of the network, from a directly connected device, or from another network to which the node is connected. For example, source node 302 may be a relay node for relaying the data packet to a destination node. Source node 302 may determine the destination node for the data packet by extracting information included in the data packet that designates the destination node (for example, in the header of the data packet).

At step 506, a path for routing the data packet from the first node to the destination node is determined. For example, source node 302 may have previously computed paths to each possible destination node in network 300 and stored the information in a path database (e.g., routing information 466 of FIG. 4). Source node 302 may determine the path for routing the data packet to destination node 310 by retrieving the stored path for routing data to the determined destination. For example, for destination node 310, source node 302 can retrieve the corresponding path 320 for routing data to destination node 310. According to some embodiments, the path to the destination node of the data packet is generated in response to determining the destination node. In other words, a path to the destination node had not been previously generated and stored but, instead, is generated in response to the need to route the data packet to the destination node. In these embodiments, determining a path for routing the data packet to the destination node includes generating the path, e.g., according to path calculation algorithms as described above.

According to some embodiments, the path may include one or more relay nodes for relaying the data packet from the first node to the destination node, the one or more relay nodes comprising a first neighbor node of the plurality of neighbor nodes for receiving the data packet from the first node. For example, path 320 for routing data from source node 302 to destination node 310 may include three relay nodes—a first neighbor node (which is both a neighbor node and a relay node for the path), node 304, which is the next hop neighbor node for path 320, and relay nodes 306 and 308. According to some embodiments, because a path to a destination node may be generated by a source node based on the source node's pruned neighborhood and/or the pruned neighborhoods of other nodes, the destination node and/or relay nodes on the path may actually be neighbor nodes of the source node. For example, path 320 designates node 304 as the next hop neighbor node and then node 306 as a relay node to relay data from node 304 to node 308 even though node 306 is a neighbor node of source node 302 because the pruned neighbor graph used to generate path 320 does not indicate a path straight from source node 302 to node 306. In other words, if neighbor pruning were not used, the path calculated for routing a data packet from source node 302 to destination node 310 may not include node 304 at all.

At step 508, a second neighbor node of the plurality of neighbor nodes is identified from among the one or more relay nodes and the destination node. At this step, the destination node and the relay nodes of the path can be compared to the list of neighbor nodes maintained by the first node. For example, source node 302 may maintain knowledge of its neighbor nodes even though it prunes its neighbor list for purposes of disseminating topology control messages and calculating routing paths. For example, source node 302 may store its full neighborhood information (e.g., in neighborhood information 468 of FIG. 4) even though only its pruned neighborhood is reflected in its generated network graph (e.g., stored in topology information 470 of FIG. 4). If a relay node identifier or the destination node identifier matches a neighbor node identifier, then the second neighbor node is identified. In other words, the first node discovers that the destination node and/or one or more of the relay nodes (other than the first neighbor node) is actually a neighbor node. For example, source node 302 checks the destination node and the relay nodes along path 320 to determine whether any are neighbor nodes and identifies node 306 of path 320 as being a neighbor node.

According to some embodiments, the first node compares the destination node first and then proceeds to work backwards along the path to the closest node to the destination node and so on until a neighbor node is identified. For example, according to some embodiments, source node 302 may first look at destination node 310 and check if destination node 310's identifier is in its list of neighbor node identifiers. As seen in FIG. 3, node 310 is not a neighbor node of source node 302 because it is outside broadcast range 312 of source node 302. Source node 302 then checks relay node 308, which is the closest node along the path to destination node 310, to see if relay node 308's identifier is in its list of neighbor node identifiers. As seen in FIG. 3, node 308 is not a neighbor node of source node 302 because it is outside broadcast range 312 of source node 302. Source node 302 then checks the previous node on the path, relay node 306, to see whether it is a neighbor node. Once again, it compares the identity of node 306 to its list of neighbor nodes and identifies node 306 as a neighbor node.

At step 510, in accordance with the identification of the second neighbor node, the data packet is transmitted to the second neighbor node. The second neighbor node may be the destination node or may be a relay node, in which case the data packet is transmitted to the second neighbor node for relay to the destination node. For example, source node 302 identifies relay node 306 as a neighbor node and instead of following the path and transmitting the data packet to node 304, source node 302 transfers the data packet to node 306. In this case, then, the length of the path has been reduced by one node and therefore, one transmission. Thus, the described route shortening method has reduced the number of transmissions required to transmit the data packet from the first node to the destination node.

Figure 5B:
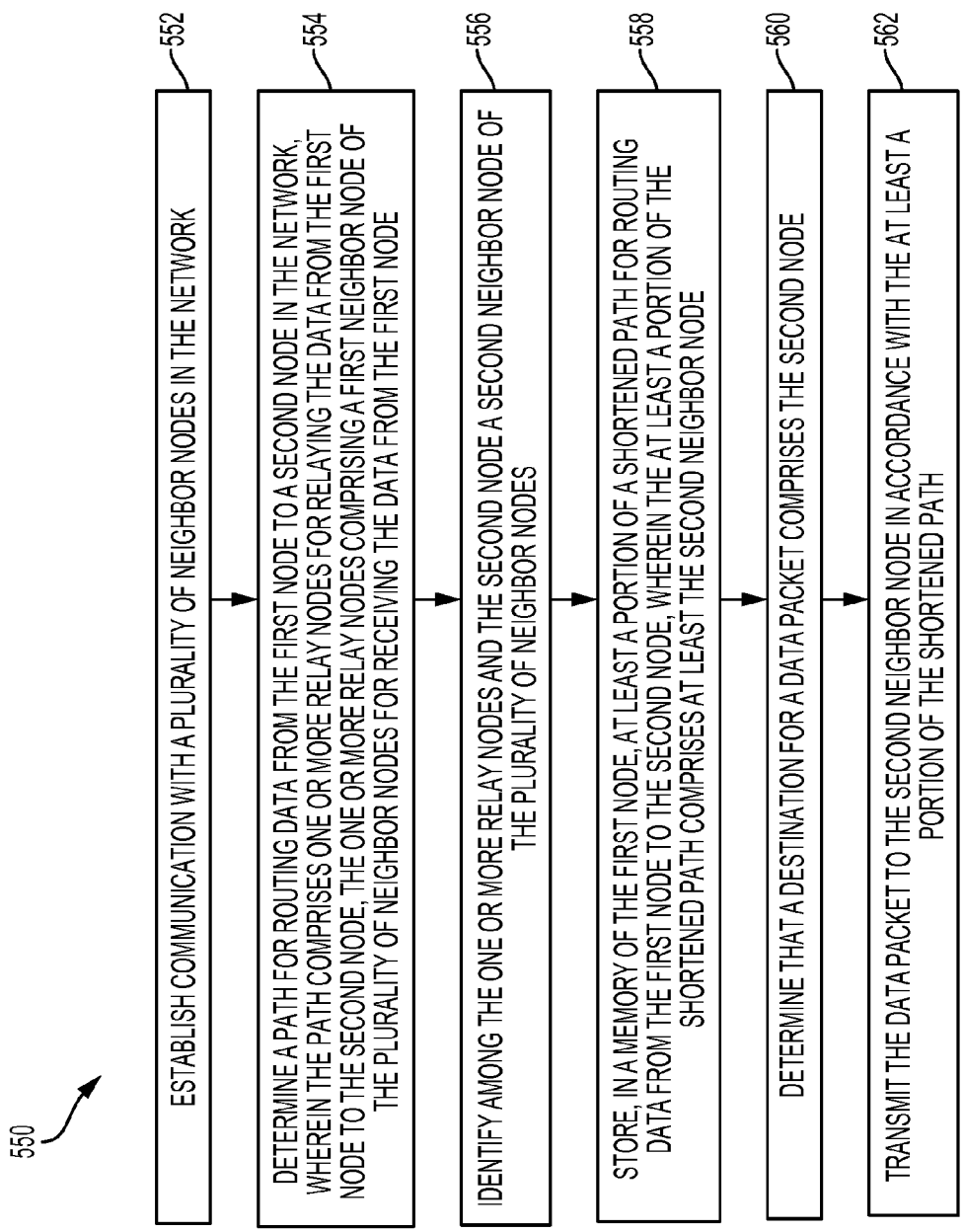
FIG. 5B is a flow diagram of a method for reducing routing control overhead according to some embodiments.

The above process performs route-shortening during the forwarding stage after determining the destination node for a data packet. According to some embodiments, as described below with respect to process 550 of FIG. 5B, route-shortening may be performed in advance of the forwarding stage—in advance of a need to forward data—for example, during periodic generation of routing paths. Thus, at the time that a data packet needs to be forwarded by the node performing the route-shortening, a shortened path has already been identified and the data packet is forwarded to the next-hop node of that shortened path. FIG. 5B is a process flow diagram illustrating process 550 for route shortening in a MANET. Process 550 may be performed by a first node of a MANET. For example, process 550 may be performed by source node 302 of network 300, as depicted in FIG. 3, according to the architecture described with respect to system 400 of FIG. 4.

At step 552, communication is established with a plurality of neighbor nodes in a network in the same manner as discussed above with respect to step 502. For example, source node 302 may establish communication with nodes that are within its broadcast range 312. According to some embodiments, establishing communication for source node 302 includes broadcasting HELLO messages and receiving HELLO messages from nodes within its broadcast range. For example, according to some embodiments, source node 302 broadcasts HELLO messages that include its network identifier. Node 304 may receive node 302's HELLO messages and may transmit its own HELLO messages that include its own identifier as well as the identifier of source node 302, indicating that it received source node 302's broadcasts. Upon receiving node 304's HELLO message, source node 302 gains knowledge of node 304 and knows that node 304 received its HELLO message (because node 304's broadcast HELLO messages include source node 302's identity). Based on this, source node 302 can add node 304 to its neighbor list (e.g., stored in neighborhood information 468 of FIG. 4). According to some embodiments, the neighbor list may be included in broadcast HELLO messages. Thus, node 304 can be established as a neighbor node of source node 302 and vice versa. Source node 302 can establish communication with each node within its broadcast range 312, in similar fashion, such that each node within broadcast range 312 is a neighbor node of source node 302.

In addition to the HELLO message, source node 302 can also broadcast a topology control message (also referred to herein as routing control message and link state update). Unlike the HELLO message, which is not retransmitted by nodes that receive it, the topology control message is relayed by other nodes to propagate through the network. According to some embodiments, the topology control message may be relayed by each node that receives it and according to some other embodiments, the topology control message is relayed only by designated nodes (e.g., according to an Optimized Link State Routing Protocol).

The topology control message may include information about source node 302's neighborhood, such as the nodes with which it has established communication and has added to its neighbor list. According to some embodiments, source node 302 prunes its neighborhood information such that only a subset of its neighbors is included in the topology control message. Therefore, its topology control message, generated based neighbor pruning, can include fewer entries than a topology control message based on an un-pruned neighborhood would, thus requiring less data and using less network bandwidth. Other nodes within the network may prune their own neighborhoods and flood the network with topology control messages that include pruned neighborhood information. In this way, nodes within network 300 generate an incomplete graph of the interconnectedness of the nodes in the network (e.g., a pruned network graph as shown in FIG. 2B versus the un-pruned network graph shown in FIG. 2A). Although, pruned graphs are incomplete in terms of interconnectedness of nodes in the network, the network may remain completely connected such that every node is connected to every other node either directly or through one or more intermediate nodes. According to some embodiments, nodes formulate, store, and update a network graph based on pruned neighbor information of nodes within the network (e.g., pruned network graphs may be stored in topology information 470 in FIG. 4).

At step 554, a path for routing data from the first node to a second node is determined. For example, source node 302 may compute paths to each possible destination node in network 300 and store the information in a path database (e.g., routing information 466 of FIG. 4). For destination node 310 (second node), source node 302 can determine path 320 for routing data to destination node 310. According to some embodiments, the first node generates routing paths based on the information in received topology control messages and its own pruned neighbor list. The first node may perform routing path computations for determining optimal paths to transmit data packets to possible destination nodes, for example, based on known routing algorithms and a pruned network graph. Specific path calculation algorithms may be based on, for example, Djikstra's shortest-path algorithm, where the routing node finds the path with least cost to each destination node. The optimal paths selected may then be used to construct a routing table, which typically includes an entry for each destination node. Each entry includes the network identifier of a given destination node and the next hop node identifier of the node determined to be the optimal next node for relaying data to a given destination node. In addition to this information, the first node may generate more detailed information about paths to destination nodes. For example, instead of maintaining only the identifier of a given destination node and the identifier of the next hop node to forward data to the given destination node, the first node can maintain the identifiers of nodes along the path from the next hop node to the given destination node. For example, where a path is determined to be: →A→B→C→D, instead of only maintaining identifiers for next hop node A and destination node D, the first node can maintain identifiers for relay nodes B and C. Generally, the relative locations of nodes along a path are also maintained such that, for example, node C is known to be further along the path than node B.

According to some embodiments, the path may include one or more relay nodes for relaying the data from the first node to the second node, the one or more relay nodes comprising a first neighbor node of the plurality of neighbor nodes for receiving the data packet from the first node. For example, path 320 for routing data from source node 302 to destination node 310 may include three relay nodes—a first neighbor node (which is both a neighbor node and a relay node for the path), node 304, which is the next hop neighbor node for path 320, and relay nodes 306 and 308. According to some embodiments, because the path to the second node may be generated based on the first node's pruned neighborhood and/or the pruned neighborhoods of other nodes, the second node and/or relay nodes on the path may actually be neighbor nodes of the first node. For example, path 320 designates node 304 as the next hop neighbor node and then node 306 as a relay node to relay data from node 304 to node 308 even though node 306 is a neighbor node of source node 302 because the pruned neighbor graph used to generate path 320 does not indicate a path straight from source node 302 to node 306.

At step 556, a second neighbor node of the plurality of neighbor nodes is identified from among the one or more relay nodes and the second node. At this step, the second node and the relay nodes of the path may be compared to the list of neighbor nodes maintained by the first node. For example, source node 302 may maintain knowledge of its neighbor nodes even though it prunes its neighbor list for purposes of disseminating topology control messages and calculating routing paths. For example, source node 302 may store its full neighborhood information (e.g., in neighborhood information 468 of FIG. 4) even though only its pruned neighborhood is reflected in its generated network graph (e.g., stored in topology information 470 of FIG. 4). If a relay node identifier matches a neighbor node identifier or the second node identifier, then the second neighbor node is identified. In other words, the first node discovers that the second node and/or one or more of the relay nodes (other than the first neighbor node) is actually a neighbor node. For example, source node 302 checks the destination node (second node) and the relay nodes along path 320 to determine whether any are neighbor nodes and identifies node 306 of path 320 as being a neighbor node. According to some embodiments, the first node compares the second node first and then proceeds to work backwards along the path to the closest node to the second node and so on until a neighbor node is identified. For example, according to some embodiments, source node 302 may first look at destination node 310 and check if destination node 310's identifier is in its list of neighbor node identifiers. As seen in FIG. 3, node 310 is not a neighbor node of source node 302 because it is outside broadcast range 312 of source node 302. Source node 302 then checks relay node 308, which is the closest node along the path to destination node 310, to see if relay node 308's identifier is in its list of neighbor node identifiers. As seen in FIG. 3, node 308 is not a neighbor node of source node 302 because it is outside broadcast range 312 of source node 302. Source node 302 then checks the previous node on the path, relay node 306, to see whether it is a neighbor node. Once again, it compares the identity of node 306 to its list of neighbor nodes and identifies node 306 as a neighbor node.

At step 558, the first node stores at least a portion of a shortened path for routing data from the first node to the second node in its memory. The shortened path includes at least one fewer relay node than the path determined at step 554. For example, the shortened path does not include at least the first neighbor node. In some embodiments, the shortened path includes only the second node (i.e., destination node) when the second node is determined to be a neighbor node. In some embodiments, storing the at least a portion of the shortened path may include updating a routing or forwarding table entry for routing data to the second node. For example, a routing or forwarding table can be updated by replacing the next hop node designated as being the optimal next hop node for forwarding data to the second node (as determined using the pruned network graph and routing algorithm) with the identified second neighbor node. For example, with respect to network 300, node 302 may update its routing table entry for routing data to destination node 310 by replacing node 304 with node 306 as the next hop node. In some embodiments, a larger portion of the shortened path (i.e., more than just the next hop node) is stored in memory. In some embodiments, the entire shortened path is stored in memory.

According to some embodiments, the above steps (554 and 556) may be performed for multiple nodes in the network. For example, they may be performed for all possible destination nodes in the network. According to some embodiments, route shortening can be performed any time routing paths are determined or updated, for example, in response to topology changes in the network in accordance with known routing protocols.

At step 560, a determination is made that a data packet is destined for the second node. For example, a data source of the node (e.g., node 302) may generate data for transmitting to a destination node (e.g., destination node 310). For example, a data source may be an email application on source node 302 that generates an email for transmitting to an email server. According to some embodiments, source node 302 does not itself generate the data, but instead, receives the data from another node of the network, from a directly connected device, or from another network to which the node is connected. For example, source node 302 may be a relay node for relaying the data packet to a destination node. Source node 302 may determine the destination node for the data packet by extracting information included in the data packet that designates the destination node (for example, in the header of the data packet).

At step 562, the data packet is transmitted to the second neighbor node in accordance with the shortened path. The data packet may be transmitted to the second neighbor node for relay to the second node, or the second neighbor node, itself, may be the second node. Unlike process 500, described above, during forwarding of a data packet according to process 550, no route-shortening is performed because it has already been performed during the route generation stage. Because route shortening has already been performed, the data can be forwarded according to the stored shortened path according to conventional forwarding protocols. For example, the first node references its routing table, determines that the second neighbor node is the next hop node for forwarding data to the second node, and transmits the data to the second neighbor node accordingly. For example, source node 302 checks its routing table to determine what the next hop node is for forwarding data to destination node 310 (which is the destination node for the data packet as determined in step 560). Its routing table indicates that the next hop node is node 306, based on previously performed route shortening steps. Instead of following the path otherwise followed in the absence of route shortening, source node 302 transfers the data packet to node 306. In this case, then, the length of the path has been reduced by one node and therefore, one transmission. Thus, the described route shortening method has reduced the number of transmissions required to transmit the data packet from the first node to the destination node.

Device for Reducing Routing Control Overhead

Figure 6:
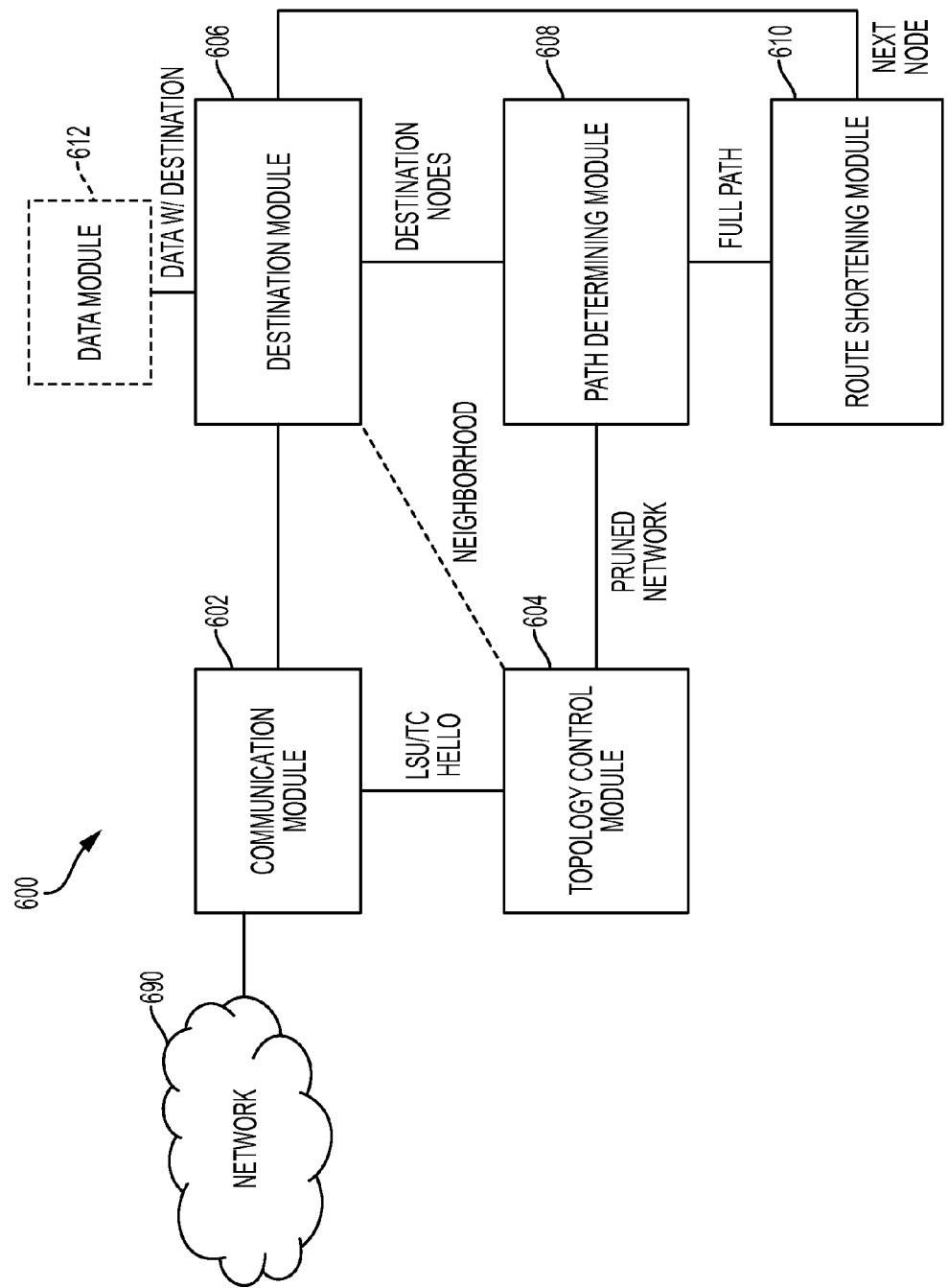
FIG. 6 is a functional block diagram of a node in a MANET according to some embodiments.

FIG. 6 is a functional block diagram of node 600 connected to a mobile ad hoc network 690 according to embodiments of methods, systems, and devices described herein (e.g., node 302 connected to network 300 in FIG. 3). Node 600 is configured to reduce the amount of routing control overhead while shortening routing paths. Node 600 establishes communication with nodes in network 690, determines a destination node for a data packet, determines a routing path for routing that data packet to the destination node, identifies a shorter path to the destination node and transmits the data packet on the shorter path. Node 600 may be a system or device that includes one or more processors, memory, and a wireless radio for communicating wirelessly with network 690. Node 600 can include communication module 602, topology control module 604, destination module 606, path determining module 608, and route shortening module 610. According to some embodiments, node 600 includes data module 612.

Communication module 602 sends and receives communications to and from other nodes in network 690. Communication module 602 can establish communication with neighbor nodes in network 690 (e.g., bi-directional communication). Establishing communication with neighbor nodes may include sending and receiving HELLO messages and topology control messages (also referred to herein as link state updates) to and from other nodes in network 690 according to known link state routing methods and protocols. According to some embodiments, communication module 602 broadcasts a HELLO message, which is received by nodes within its broadcast range that are listening on a well-known port. The HELLO message can include node 600's network identifier and information about established neighbor nodes of node 600. Another node that receives node 600's HELLO message (e.g., node 304 of network 300) may add node 600 to its list of nodes that can be heard, which is included in its own broadcast HELLO message. Communication module 602 may receive the other node's broadcast HELLO message and may determine (a) that node 600 is within the broadcast range of the other node and (b) that the other node is within the broadcast range of node 600. Based on this determination of bi-directional communication between node 600 and the other node, the other node is established as a neighbor node of node 600 (also referred to herein as a one-hop neighbor). This process may be repeated for each node within the broadcast range of node 600 and node 600 can build a neighbor table with identifiers of neighbor nodes with which it has established communication.

According to some embodiments, HELLO messages broadcast by nodes in network 690 include neighbor tables identifying the one-hop neighbors of a given node. Upon receiving a HELLO message, node 600 can build a two-hop neighbor table by comparing the one-hop neighbor table of a given neighbor node with its own list of one-hop neighbors. Where a one-hop neighbor of the given neighbor node is not a one-hop neighbor of node 600, node 600 determines that the neighbor node is within two hops, i.e., communicating with the node requires a relay by a one-hop neighbor (also referred to herein as a two-hop neighbor).

HELLO messages may be generated proactively, at a fixed or dynamic interval. For example, a regular interval may be backed off due to congestion or network stability. HELLO messages may also be generated reactively as a response to a change in the node or its neighborhood. For example, a HELLO message may be transmitted on first becoming active or in response to a new, lost, or changed link status. The generation and transmission of HELLO messages may be a combination of these mechanisms or other mechanisms.

According to some embodiments, node 600 may periodically obtain or perform a series of tests to obtain the cost associated with the link to each of its neighbors. These costs may be measures of end-to-end delay, throughput, etc.

According to some embodiments, communication module 602 manages the establishment of communication with neighbor nodes, e.g., by constructing and deconstructing HELLO messages. According to other embodiments, communication module 602 passes received HELLO messages on to topology control module 604 and transmits node 600's HELLO messages constructed by topology control module 604 to other nodes in network 690.

According to some embodiments, topology control module 604 may generally manage node 600's knowledge of the topology of network 690, including the identity of nodes in network 690 and the connections between the nodes, and manage the dissemination of information about node 600 to node in network 690. Topology control module 604 may also manage the neighborhood of node 600 including managing the establishment of nodes as neighbor nodes, the update of one-hop and, according to some embodiments, two-hop neighbor tables, and the reading and formation of HELLO messages.

Topology control module 604 can manage topology information through topology control messages (also known as link state updates). Topology control messages are periodically built by each routing node and broadcast to neighboring nodes. Topology control messages may include link identifiers that identify a communication link between two nodes, a link state field that may be used to identify the state of the link (e.g., active, idle, congested, unavailable, etc.), one or more cost metric fields that contain the cost values of the connected link, and a link neighbor field that may be used to identify adjacent connected nodes.

Topology control messages may also contain information identifying the initiating node (the node that constructed the given topology control message as opposed to relaying the topology control message), and a sequence number that monotonically increases each time the initiating node constructs a new topology control message. The topology control message may also include age parameters to prevent a packet wandering in the network for an indefinite period of time. Upon receiving a topology control message, nodes may further disseminate the message to its neighbors so that all the routing nodes in a network rapidly obtain the most updated topology control messages. The specific data structures of topology control messages may vary from different routing protocols and the details may be found in the standards for each protocol.

Upon receiving a topology control message from another node in network 690, topology control module 604 updates a link state database for each respective link in the topology control message. Topology control module 604 may store the most up to date information obtained from the topology control messages and HELLO messages. This information can be used to construct a topology graph of network 690. The topology graph represents all the network nodes (e.g., such as the network graph shown in FIG. 2B.

According to some embodiments, topology control module 604 contributes to reduction of topology management of network 690 by reducing the amount of information it includes in its topology control messages. Unlike conventional topology control messages which generally include entries for most or all of a given node's links to neighbor nodes, topology control module 604 constructs topology control messages with information about only a subset of its neighbor node links. Embodiments may employ various methods for selecting the subset of neighbor links it will include in topology control messages (a process known as neighbor pruning) according to known methods (for example, Random neighbor selection, Local Minimum Spanning Tree (LMST) algorithm, Distributed Relative Neighborhood Graph (DistRNG) algorithm, XTC algorithm, Connected Dominating Set (CDS) based algorithms, etc.). According to some embodiments, the subset need not be fixed but can be periodically re-determined based on various criteria such as loss of communication with neighbors, size of the network, quality of links, etc. Generally, neighbor pruning methods seeks to determine a minimum set of neighbors that will maintain the connectivity of node 600 to nodes in network 690. According to some embodiments, the set is chosen such that nodes in network 690 remain connected (i.e., data can be transmitted from any node to any other node in the network). An example of neighbor pruning is illustrated in FIGS. 2A and 2B as discussed above. In FIG. 2A, node 210, for example, has established communication with 19 neighbor nodes. A conventional topology control message transmitted by node 210 would include entries of each of 19 links. Through neighbor pruning, node 210 may reduce its neighborhood (for the purpose of its topology control messages) to just three links as shown in FIG. 2B. Note that node 210 is still connected to each of the other nodes.

Based on its own neighbor pruning and information received about the pruned neighborhoods of other nodes in network 690 received in topology control messages, topology control module 604 can construct and maintain a pruned network graph (e.g., as illustrated in FIG. 2B).

Communication module 602 may send and receive data packets routed through network 690. For a received data packet, communication module 602 forwards all or part of the packet to destination module 606. Destination module 606 determines the destination node for the data packet. For example, the data packet may include the data intended for the destination node as well as data about the sending node, the destination node, packet age, etc. Destination module 606 may read the destination node from the data packet. If the destination node is node 600 itself, the destination module may strip off the routing information and pass the data on to another module in node 600. If the destination node is another node in network 690, destination module 606 determines the destination node (e.g., reads the destination node's network identifier from the data packet) and communicates that information to path determining module 608.

According to some embodiments, destination module 606 receives a data packet from data module 612. Data module 612 may manage data communication from any applications or other hardware and/or software associated with node 600. This may include, for example, programs running on node 600, multimedia input and/or output sources such as a digital camera or video connected to node 600, etc. More generally, data module 612 may manage communication of data from any application, device, sensor, or the like associated with node 600 that might communicate data. According to some embodiments, destination module 606 determines the destination node that the data packet from data module 612 is intended to be routed to.

According to some embodiments, destination module 606 compares the determined destination for a data packet to the list of neighbor nodes maintained by topology control module 604. If the destination node is a neighbor node of node 600, then node 600 transmits the data packet to the destination node without first executing the routing steps described below.

According to some embodiments, once the destination node for a data packet is determined, the destination node identifier is communicated to path determining module 608 to determine how to route the data packet from node 600 to the destination node. Path determining module 608 manages information about the routing of data from node 600 to other nodes in network 690. According to some embodiments, a routing path from node 600 to each node in network 690 is maintained by path determining module 608. According to some embodiments, path determining module 608 maintains information about routing paths to other nodes based on the current state of the network topology. In some embodiments, path determining module 608 determines the routing path to the destination node of a data packet after the destination node is determined.

According to some embodiments, path determining module 608 determines routing paths to nodes in network 690 based on the pruned network graph established and maintained by topology control module 604. Path determining module 608 may be configured to perform link state routing computations for determining optimal routing paths to transmit packet data to all possible destination nodes. Routing path determinations may be performed based on a predetermined routing algorithm and information about the pruned network. Specific calculation algorithms may be based on, for example, Djikstra's shortest-path algorithm, where the routing node finds the path with least cost to each destination node. The optimal routing paths may then be used to construct a routing table. Generally, routing tables include, for each destination node, the next one-hop node to which data should be transmitted in order to route the data to the destination node on the optimal routing path but do not include the nodes on the path beyond the next one-hop node. According to some embodiments, path determining module 408 constructs a conventional routing table and, in addition, a table or other data structure that includes more detailed information about the path, such as identifiers of other nodes along the optimal routing path (including relative locations on the routing path, i.e., which is first, which is second, etc.). For example, the information about the path could detail that the path includes: next one-hop node→relay node B→relay node C→ . . . →destination node). According to some embodiments, path determining module 408 augments a conventional routing table to include complete information about a given path. For example, an entry in the augmented table (or separate table) may include, for a given destination node: "D|A, B, C" where "D" is the network identifier of the destination node, "A" is the network identifier of the next one-hop node, and "B" and "C" are network identifiers of relay nodes B and C, respectively. The ordering of the node identifiers can indicate their relative position on the path.

Generally, for any routing path that is longer than two hops (i.e. there are more than one relay nodes between node 600 and the destination mode), the path to the destination node includes the next one-hop node (which is a neighbor node of node 600) and one or more additional relay nodes between the next one-hop node and the destination node. For example, for path 320 of FIG. 3 from source node 302 to destination node 310, the next one-hop node is node 304 and the additional relay nodes are nodes 306 and 308. Path determining module 608 constructs a path based on the assumption that the data packet will be transmitted first to the next one-hop node, which will then transmit the data packet in turn to the first relay node, which will then transmit the data packet in turn to the next relay node, etc. until the data packet reaches the destination node.

According to some embodiments, path determining module 608 references its database of paths to determine the full path (including identifiers to each node along the path) to the destination node, as determined by destination module 606. The determined path is then passed along to route shortening module 610 for determination of whether and how the path can be shortened.

Route shortening module 610 receives the path to the destination node from path determining module 608, which was constructed based on a pruned network graph, and compares one or more nodes on the path and/or the destination node to the neighbor list of node 600 to determine whether relay nodes on the path are neighbor nodes of node 600. If a relay node or the destination node is identified as being a neighbor node, then transmission to the identified neighbor node shortens the path to the destination node. Because the path was constructed based on a pruned network graph, one or more of the relay nodes on the path may be neighbor nodes of node 600. According to some embodiments, route shortening module 610 first checks the destination node to determine whether it is a neighbor node by comparing its network identifier to node 600's neighbor list (e.g., generated and maintained by topology control module 604). If the network identifier of the destination node does not match a network identifier in the neighbor list, route shortening module 610 works backwards and checks the farthest relay node along the path to determine whether it is a neighbor node by comparing its network identifier to node 600's neighbor list. If the network identifier of the farthest relay node does not match a network identifier in the neighbor list, route shortening module 610 checks the preceding node along the path to determine whether it is a neighbor node. Upon identifying the destination node or a relay node as a neighbor node, route shortening module 610 can select that destination/relay/neighbor node as the next one-hop node and communicate the selection to destination module 606.

According to some embodiments, route shortening module 610 identifies as a neighbor node the first node on the path (the next one-hop neighbor node) and selects this node as the next one-hope node, and thus, the path remains the same as determined by path determining module 608. According to some embodiments, route shortening module 610 stops checking for neighbor nodes upon reaching the originally designated next one-hop module and returns the originally designated next one-hop module identifier to destination module 606 or some other indication that the route cannot be shortened. According to some embodiments, once route shortening module 610 identifies a second neighbor node by working backwards along the path, starting with the destination node, the identification process ceases.

Destination module 606 can receive the selected next one-hop node from route-shortening module 610 and repackage the data packet for transmission by communication module 602 to the next one-hop node.

According to some embodiments, other nodes in the network may be configured similarly to node 600 and can shorten the route of a data packet even further. Node 600 may shorten the path of a data packet by one node and transmit the data packet along the shortened path to the identified neighbor node. Then, the neighbor node can shorten the path of the data packet further by identifying its own neighbor nodes among nodes of the remaining path. Each node that receives the data packet can perform route-shortening steps, which may greatly reduce the overall length of the path from the node that originated the data packet to the destination node for the data packet.

For example, with respect to FIG. 3, node 302 may shorten the path by one node, as described above, and transmit the data packet to node 306. Then, node 306 may conduct its own route shortening process and identify destination node 310 as a neighbor node. In accordance with this determination, node 306 may transmit the data packet to destination node 310. Thus, whereas the original path from node 302 to destination node 310 indicated three relay nodes (304, 306, and 308) requiring four transmissions of the data packet, successive route shortenings can result in a route of just one relay node (306) requiring only two transmission of the data packet.

The systems, methods, and devices described herein may be used for optimizing routing in MANETs. After determining a routing path for routing a data packet to a destination node in a MANET, a source node analyzes the path to determine whether one or more portions of the path can be omitted. Upon determining that a portion of the path can be omitted, i.e., that the path can be shortened, the source node can route data based on the shortened path.

The ability to optimize routing paths, according to these systems, methods, and devices, enables nodes in a network to generate sub-optimal routing paths that include more nodes than necessary, which in turn, enables reduction of required network maintenance overhead. The network is not penalized by these sub-optimal routing paths because of the optimizations described herein, and the reduction of network maintenance overhead can enable a larger network (more nodes) and/or greater data traffic.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed as new and desired to be protected by Letters Patent of the United States is:

1. A method for routing data packets in a network, comprising:
    at a first node of the network:
        establishing communication with a plurality of neighbor nodes in the network, the plurality of neighbor nodes being within a radio communication range of the first node;
        determining a destination node for a data packet;
        determining a path for routing the data packet from the first node to the destination node, wherein the path comprises a sequence of one or more relay nodes for relaying the data packet from the first node to the destination node, the one or more relay nodes comprising a first neighbor node of the first node for receiving the data packet from the first node;
        comparing the destination node and each node in the sequence of one or more relay nodes in backwards order with the plurality of neighbor nodes until a node from the one or more relay nodes and the destination node is identified as being a second neighbor node of the first node; and
        reducing a length of the path by transmitting the data packet to the second neighbor node instead of the first neighbor node in response to identifying the second neighbor node.

2. The method of claim 1, wherein the network is a wireless ad-hoc network that routes data within the network using wireless radio signals.

3. The method of claim 1, wherein establishing communication with a plurality of neighbor nodes comprises communicating directly with each node of the plurality of neighbor nodes.

4. The method of claim 1, wherein establishing communication with a plurality of neighbor nodes comprises:
    broadcasting a first message comprising identification of the first node;
    receiving a neighbor message from each neighbor node in the plurality of neighbor nodes, wherein for a respective neighbor node, the neighbor message comprises the identification of the first node and identification of the respective neighbor node; and
    broadcasting a second message containing identification of the first node and identification of each neighbor node in the plurality of neighbor nodes.

5. The method of claim 1, wherein identifying the second neighbor node comprises:
    selecting a first selected node of the one or more relay nodes and the destination node;
    determining whether the plurality of neighbor nodes comprises the first selected node;
    in accordance with a determination that the plurality of neighbor nodes does not comprise the first selected node, selecting a second selected node of the one or more relay nodes, wherein the second selected node is selected so as to be between the first selected node and the first node on the path; and
    determining whether the plurality of neighbor nodes comprises the second selected node.

6. The method of claim 1, wherein the first node receives, from a respective node in the network, information about a subset of neighbor nodes for the respective node and the path is determined based on the information.

7. The method of claim 1, wherein:
    prior to determining the destination node for the data packet, the first node receives a message originated by the destination node comprising a list of one or more selected neighbor nodes; and
    the path for routing the data packet is determined at least in part based on the list of one or more selected neighbor nodes.

8. The method of claim 1, wherein reducing the length of the path comprises reducing an amount of nodes required to relay the data packet form the first node to the destination node.

9. The method of claim 1, comprising:
    maintaining a sparse network topology of the network, wherein the path is determined based on the sparse network topology.

10. A device for routing data packets in a network, comprising:
    one or more processors,
    memory, and
    one or more programs, wherein the one or more programs are stored in the memory and configured to be executed by the one or more processors, the one or more programs comprising instructions for:
        establishing communication with a plurality of neighbor nodes in the network, the plurality of neighbor nodes being within a radio communication range of the first node;
        determining a destination node for a data packet;
        determining a path for routing the data packet from the device to the destination node, wherein the path comprises a sequence of one or more relay nodes for relaying the data packet from the device to the destination node, the one or more relay nodes comprising a first neighbor node of the first node for receiving the data packet from the device;
        comparing the destination node and each node in the sequence of one or more relay nodes in backwards order with the plurality of neighbor nodes until a node from the one or more relay nodes and the destination node is identified as being a second neighbor node of the first node; and
        reducing a length of the path by transmitting the data packet to the second neighbor node instead of the first neighbor node in response to identifying the second neighbor node.

11. The device of claim 10, wherein the network is a wireless ad-hoc network that routes data within the network using wireless radio signals.

12. The device of claim 10, wherein establishing communication with a plurality of neighbor nodes comprises communicating directly with each node of the plurality of neighbor nodes.

13. The device of claim 10, wherein establishing communication with a plurality of neighbor nodes comprises:
broadcasting a first message comprising identification of the device;
receiving a neighbor message from each neighbor node in the plurality of neighbor nodes, wherein for a respective neighbor node, the neighbor message comprises the identification of the device and identification of the respective neighbor node; and
broadcasting a second message containing identification of the device and identification of each neighbor node in the plurality of neighbor nodes.

14. The device of claim 10, wherein identifying the second neighbor node comprises:
selecting a first selected node of the one or more relay nodes and the destination node;
determining whether the plurality of neighbor nodes comprises the first selected node;
in accordance with a determination that the plurality of neighbor nodes does not comprise the first selected node, selecting a second selected node of the one or more relay nodes, wherein the second selected node is selected so as to be between the first selected node and the device on the path; and
determining whether the plurality of neighbor nodes comprises the second selected node.

15. The device of claim 10, wherein the device receives, from a respective node in the network, information about a subset of neighbor nodes for the respective node and the path is determined based on the information.

16. The device of claim 10, wherein:
prior to determining the destination node for the data packet, the device receives a message originated by the destination node comprising a list of one or more selected neighbor nodes; and
the path is determined at least in part based on the list of one or more selected neighbor nodes.

17. The device of claim 10, wherein reducing the length of the path comprises reducing an amount of nodes required to relay the data packet form the first node to the destination node.

18. A non-transitory computer readable storage medium storing one or more programs, the one or more programs comprising instructions, which when executed by a node of a network, cause the node to:
establish communication with a plurality of neighbor nodes in the network, the plurality of neighbor nodes being within a radio communication range of the first node;
determine a destination node for a data packet;
determine a path for routing the data packet from the node to the destination node, wherein the path comprises a sequence of one or more relay nodes for relaying the data packet from the node to the destination node, the one or more relay nodes comprising a first neighbor node of the first node for receiving the data packet from the node;
compare the destination node and each node in the sequence of one or more relay nodes in backwards order with the plurality of neighbor nodes until a node from the one or more relay nodes and the destination node is identified as being a second neighbor node of the first node; and
reducing a length of the path by transmitting the data packet to the second neighbor node for relay to the destination node instead of the first neighbor node in response to identifying the second neighbor node.

19. A method for routing data packets in a network, comprising:
at a first node of the network:
establishing communication with a plurality of neighbor nodes in the network, the plurality of neighbor nodes being within a radio communication range of the first node;
storing, in a memory of the first node, information identifying the plurality of neighbor nodes;
determining a path for routing data from the first node to a second node in the network, wherein the path comprises a sequence of one or more relay nodes for relaying the data from the first node to the second node, the one or more relay nodes comprising a first neighbor node of the first node for receiving the data from the first node;
comparing the destination node and the one or more nodes in the sequence with the information identifying the plurality of neighbor nodes until a node from the one or more relay nodes and the destination node is identified as being a second neighbor node of the first node;
storing, in the memory of the first node, at least a portion of a shortened path for routing data from the first node to the second node, wherein the at least a portion of the shortened path comprises at least the second neighbor node;
determining that a destination for a data packet comprises the second node; and
reducing a length of the path by transmitting the data packet to the second neighbor node instead of the first neighbor node in accordance with the at least a portion of the shortened path stored in the memory.

20. The method of claim 19, wherein the network is a wireless ad-hoc network that routes data within the network using wireless radio signals.

21. The method of claim 19, wherein establishing communication with a plurality of neighbor nodes comprises communicating directly with each node of the plurality of neighbor nodes.

22. The method of claim 19, wherein establishing communication with a plurality of neighbor nodes comprises:
broadcasting a first message comprising identification of the first node;
receiving a neighbor message from each neighbor node in the plurality of neighbor nodes, wherein for a respective neighbor node, the neighbor message comprises the identification of the first node and identification of the respective neighbor node; and
broadcasting a second message containing identification of the first node and identification of each neighbor node in the plurality of neighbor nodes.

23. The method of claim 19, wherein identifying the second neighbor node comprises:
selecting a first selected node of the one or more relay nodes and the second node;
determining whether the plurality of neighbor nodes comprises the first selected node;
in accordance with a determination that the plurality of neighbor nodes does not comprise the first selected node, selecting a second selected node of the one or more relay nodes, wherein the second selected node is selected so as to be between the first selected node and the first node on the path; and determining whether the plurality of neighbor nodes comprises the second selected node.

24. The method of claim 19, wherein the first node receives, from a respective node in the network, information about a subset of neighbor nodes for the respective node and the path is determined based on the information.

25. The method of claim 19, wherein:

prior to determining the path for routing data from the first node to the second node, the first node receives a message originated by the second node comprising a list of one or more selected neighbor nodes; and the path for routing the data is determined at least in part based on the list of one or more selected neighbor nodes.

26. The method of claim 19, wherein the method reduces an amount of nodes required to relay the data packet from the first node to the second node.

27. A device for routing data packets in a network, comprising:

one or more processors, memory, and one or more programs, wherein the one or more programs are stored in the memory and configured to be executed by the one or more processors, the one or more programs comprising instructions for:

establishing communication with a plurality of neighbor nodes in the network, the plurality of neighbor nodes being within a radio communication range of the first node;

storing, in a memory of the first node, information identifying the plurality of neighbor nodes;

determining a path for routing data from the device to a second node in the network, wherein the path comprises a sequence of one or more relay nodes for relaying the data from the first node to the second node, the one or more relay nodes comprising a first neighbor node of the first node for receiving the data from the device;

comparing the destination node and the one or more relay nodes in the sequence with the information identifying the plurality of neighbor nodes until a node from the one or more relay nodes and the destination node is identified as being a second neighbor node of the first node;

storing, in a routing table in the memory of the first node, at least a portion of a shortened path for routing data from the first node to the second node, wherein the at least a portion of the shortened path comprises at least the second neighbor node;

determining that a destination for a data packet comprises the second node; and reducing a length of the path by transmitting the data packet to the second neighbor node instead of the first neighbor node in accordance with the at least a portion of the shortened path stored in the routing table.

* * * * *